（12） United States Patent
Fujisawa et al.

(10) Patent No.: US 11,212,027 B2
(45) Date of Patent: Dec. 28, 2021

(54) OPTICAL PATH SETTING DEVICE, OPTICAL COMMUNICATION SYSTEM, AND OPTICAL PATH SETTING METHOD

(71) Applicant: NEC CORPORATION, Tokyo (JP)

(72) Inventors: Shinsuke Fujisawa, Tokyo (JP); Hitoshi Takeshita, Tokyo (JP); Shigeyuki Yanagimachi, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

(21) Appl. No.: 16/767,876

(22) PCT Filed: Nov. 29, 2018

(86) PCT No.: PCT/JP2018/043903
§ 371 (c)(1),
(2) Date: May 28, 2020

(87) PCT Pub. No.: WO2019/107471
PCT Pub. Date: Jun. 6, 2019

(65) Prior Publication Data
US 2020/0374607 A1 Nov. 26, 2020

(30) Foreign Application Priority Data
Dec. 1, 2017 (JP) .............................. JP2017-231931

(51) Int. Cl.
*H04J 14/02* (2006.01)
*H04Q 11/00* (2006.01)

(52) U.S. Cl.
CPC ...... *H04J 14/0227* (2013.01); *H04J 14/0267* (2013.01); *H04Q 11/0062* (2013.01);
(Continued)

(58) Field of Classification Search
CPC .............. H04J 14/0227; H04J 14/0267; H04Q 11/0062; H04Q 2011/0086; H04Q 2011/0088
See application file for complete search history.

(56) References Cited

U.S. PATENT DOCUMENTS

2012/0224851 A1* 9/2012 Takara ............... H04J 14/0221
398/45
2012/0230680 A1* 9/2012 Fujita ................ H04B 10/0795
398/29

FOREIGN PATENT DOCUMENTS

JP 09-289494 A 11/1997
JP 2001-144693 A 5/2001
(Continued)

OTHER PUBLICATIONS

International Search Report of PCT/JP2018/043903 dated Feb. 12, 2019 [PCT/ISA/210].
(Continued)

*Primary Examiner* — Casey L Kretzer
(74) *Attorney, Agent, or Firm* — Sughrue Mion, PLLC

(57) ABSTRACT

This optical path setting device comprises: a transmission characteristic calculating means for calculating an inter-endpoint transmission characteristic that is a characteristic for transmission between endpoints of an optical path accommodating traffic in a plurality of optical communication systems; a required wavelength bandwidth determining means for determining a required wavelength bandwidth that is a wavelength bandwidth meeting an arrival performance of the optical path on the basis of the inter-endpoint transmission characteristic; and an accommodating wavelength band determining means for determining, as an accommodating wavelength band for accommodating the optical path, a common wavelength band that is a wavelength band where an optical path having the required (Continued)

wavelength bandwidth can be allocated, and that is common to the plurality of optical communication systems.

18 Claims, 18 Drawing Sheets

(52) U.S. Cl.
CPC ............... *H04Q 2011/0086* (2013.01); *H04Q 2011/0088* (2013.01)

(56) References Cited

FOREIGN PATENT DOCUMENTS

| | | |
|---|---|---|
| JP | 2007-082086 A | 3/2007 |
| JP | 2012-175123 A | 9/2012 |
| JP | 2015-501088 A | 1/2015 |
| JP | 2016-134664 A | 7/2016 |
| WO | 2011/030897 A1 | 3/2011 |
| WO | 2015/182070 A1 | 12/2015 |

OTHER PUBLICATIONS

Written Opinion of PCT/JP2018/043903 dated Feb. 12, 2019 [PCT/ISA/237].

\* cited by examiner

| OPTICAL COMMUNICATION SYSTEM | ROUTE | TRANSMISSION CHARACTERISTIC | MARGIN |
|---|---|---|---|
| 11-1 | 111-3 | 28.0 dB | 3.0 dB |
| 11-2 | 111-4 | 23.0 dB | 2.3 dB |
| 12 | 121 | 18.0 dB | 1.6 dB |

FIG. 8B

| LANDING STATION | TRANSMISSION CHARACTERISTIC DEGRADATION |
|---|---|
| 13-1 | 0.2 dB |
| 13-2 | 0.2 dB |

FIG. 14A

| OPTICAL COMMUNICATION SYSTEM | ROUTE | TRANSMISSION CHARACTERISTIC | MARGIN |
|---|---|---|---|
| 11-1 | 111-3 | 28.0 dB | 3.0 dB |
| 11-2 | 111-4 | 23.0 dB | 2.3 dB |
| 11-2 | 111-5 | 25.0 dB | 2.3 dB |
| 11-2 | 111-6 | 27.0 dB | 2.3 dB |
| 12 | 121 | 18.0 dB | 1.6 dB |

FIG. 14B

| LANDING STATION | TRANSMISSION CHARACTERISTIC DEGRADATION |
|---|---|
| 13-1 | 0.2 dB |
| 13-2 | 0.2 dB |

FIG. 15
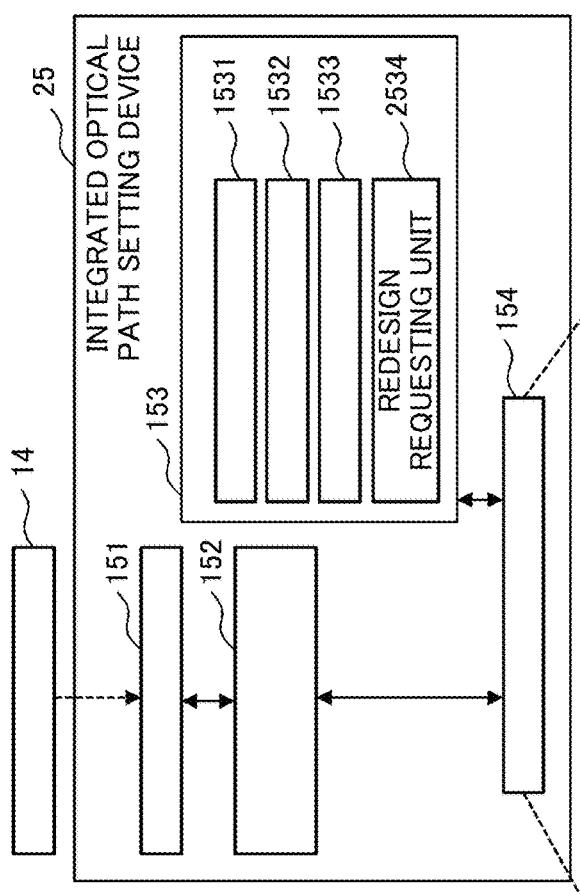
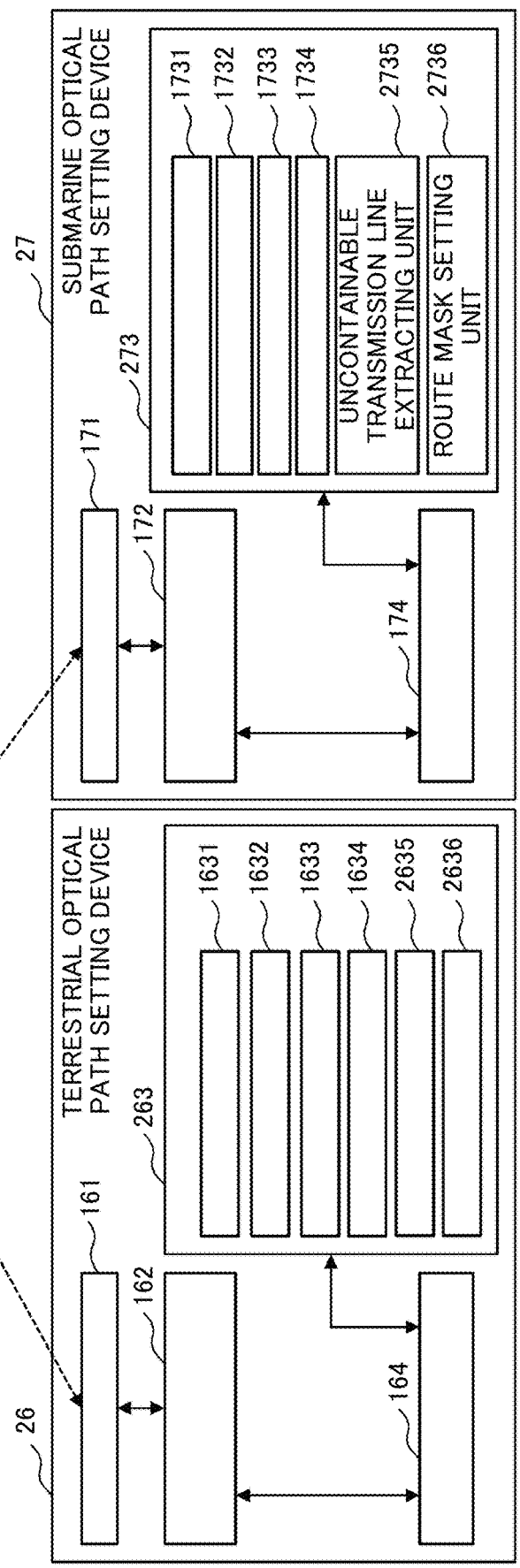

OPTICAL PATH SETTING DEVICE, OPTICAL COMMUNICATION SYSTEM, AND OPTICAL PATH SETTING METHOD

CROSS REFERENCE TO RELATED APPLICATIONS

This application is a National Stage of International Application No. PCT/JP2018/043903, filed Nov. 29, 2018, claiming priority to Japanese Patent Application No. 2017-231931, filed Dec. 1, 2017, the contents of all of which are incorporated herein by reference in their entirety.

TECHNICAL FIELD

The present invention relates to an optical path setting device, an optical communication system, and an optical path setting method, and, particularly, relates to an optical path setting device, an optical communication system, and an optical path setting method that are used in a terrestrial optical communication system and a submarine optical communication system.

BACKGROUND ART

An optical communication system provides a function of communicating a requested traffic via an optical fiber communication channel connecting locations. In an optical communication system, a large capacity of signal light in which requested traffics from clients are multiplexed by using various multiplexing schemes is communicated via an optical fiber communication channel. As a multiplexing scheme, a wavelength division multiplexing (WDM) scheme, a time division multiplexing (TDM) scheme, and the like are used. In recent years, one optical path is capable of accommodating traffic of a 400 giga bits per second (Gbps) range, and large-capacity communication of at most a 25 tera bits per second (Tbps) range is possible by the wavelength division multiplexing scheme.

Among optical communication systems, a submarine optical communication system using a submarine cable is very important for providing a high-speed and large-capacity communication infrastructure between lands separated by an ocean. A submarine optical communication system installs structures called landing stations at opposite shores of lands separated by an ocean, and provides a function of communicating a requested traffic via a submarine cable connecting between the landing stations. In general, a landing station is installed at seashore, and a terrestrial optical communication system and a submarine optical communication system are connected at the landing station. Examples of such a submarine optical communication system are described in PTLs 1 and 2.

CITATION LIST

Patent Literature

[PTL 1] Japanese Unexamined Patent Application Publication No. H09-289494
[PTL 2] Japanese Unexamined Patent Application Publication No. 2001-144693
[PTL 3] International Publication No. WO 2011/030897

SUMMARY OF INVENTION

Technical Problem

In an existing optical communication system, in order to accommodate a service request via a submarine optical communication system, first, a terrestrial optical path setting device included in a terrestrial optical communication system establishes an optical path between a terrestrial location and a landing station being endpoints of a requested traffic. Subsequently, a submarine optical path setting device included in a submarine optical communication system establishes an optical path capable of accommodating a requested traffic between landing stations. Both the terrestrial optical path and the submarine optical path are terminated, and requested traffics accommodated by the optical paths are connected by a fine-granularity switching device on an electrical stage. Examples of a fine-granularity switching device on an electrical stage include a layer 2 switch and an internet protocol (IP) router. In other words, the terrestrial optical path and the submarine optical path are terminated at landing stations, and the terrestrial optical communication system and the submarine optical communication system separately manage an optical path.

As described above, in an existing optical communication system, a terrestrial optical communication system and a submarine optical communication system have independent optical path setting devices. Then, the optical path setting device included in each of the optical communication systems independently determines a setting value for an optical path, with reference to a transmission line parameter and an already allocated optical path setting value. The reason is that, in a submarine optical communication system, a transmission distance of an optical path is several times to several tens of times larger than that in a terrestrial optical communication system, and thus, a transmitter/receiver specific to a submarine optical communication system needs to be introduced. Then, the reason is that, for such a transmitter/receiver specific to a submarine optical communication system, an optical path setting value needs to be determined with high precision from a transmission line parameter. Further, limitation on the maximum power that can be supplied to a submarine cable is also a difference from a terrestrial optical communication system.

From such reasons, an existing optical communication system has a configuration in which a terrestrial optical communication system and a submarine optical communication system are separated and each manage an optical path.

FIG. 16 illustrates one example of a configuration of a relevant terrestrial/submarine separated optical communication system that separately manages a terrestrial optical communication system and a submarine optical communication system as described above.

A relevant terrestrial/submarine separated optical communication system 90 includes terrestrial optical communication systems 91-1 and 91-2, a submarine optical communication system 92, landing stations 93-1 and 93-2, and a requested service accommodating device 94. Herein, a case in which the relevant terrestrial/submarine separated optical communication system 90 includes two terrestrial optical communication systems 91-1 and 91-2 and two landing stations 93-1 and 93-2 will be described as an example. However, the number of terrestrial optical communication systems and the number of landing stations are not limited thereto. When devices and the like of an identical type do not need to be distinguished from each other, an index (−1, −2, etc.) will be omitted.

The terrestrial optical communication system 91 includes terrestrial node devices 910 and a terrestrial optical path setting device 96. The submarine optical communication system 92 includes submarine node devices 920 and a submarine optical path setting device 97. The landing station 93 includes a terrestrial optical node device 910, a submarine node device 920, and a fine-granularity switching device 930.

Next, an operation in which the relevant terrestrial/submarine separated optical system accommodates a requested service in an optical path will be described.

The requested service accommodating device 94 notifies the terrestrial optical path setting devices 96-1 and 96-2 of a traffic request for a service to be accommodated in the terrestrial/submarine separated optical communication system 90. The terrestrial optical path setting device 96 determines, for an optical path accommodating a requested traffic in the terrestrial optical communication system 91, an optical path setting value such as a physical route, the number of required wavelength slots, and an accommodating wavelength slot number. The terrestrial node device 910 being an endpoint of the requested traffic sends, based on the optical path setting value, an optical path accommodating the requested traffic. Further, the terrestrial optical path setting device 96 sets, for the terrestrial node device 910 on a physical route accommodating the optical path, an optical path route along a route of the optical path.

Similarly, the requested service accommodating device 94 notifies the submarine optical path setting device 97 of a traffic request for a service to be accommodated in the terrestrial/submarine separated optical communication system 90. The submarine optical path setting device 97 determines, for an optical path accommodating a requested traffic in the submarine optical communication system 92, an optical path setting value such as the number of required wavelength slots and an accommodating wavelength slot number.

The optical path is terminated at the terrestrial node devices 910-1 and 910-2 included in the landing stations 93. The fine-granularity switching devices 930-1 and 930-2 included in the landing stations 93 select, based on priority relating to multiplexing of the requested traffics notified by the requested service accommodating device 94, requested traffics to be multiplexed, and send the multiplexed requested traffics to the submarine node device 920. The submarine node device 920 sends, based on the optical path setting value, an optical path accommodating the multiplexed requested traffics.

With the above-described operation, an optical path accommodating a requested service is established in the terrestrial/submarine separated optical communication system 90.

Incidentally, a communication traffic amount between large-scale data centers arranged all over the world tends to increase in recent years. With an increase in a communication traffic amount between data centers, there arises a problem of an increase in delay and an increase in power consumption due to termination of an optical path at a landing station. In order to prevent such a problem, research is conducted on a terrestrial/submarine connected optical communication system in which a terrestrial optical communication system and a submarine optical communication system are connected by introducing a coarse-granularity switching device. In such a terrestrial/submarine connected optical communication system, a coarse-granularity switching device is introduced to a landing station, and switching control is carried out on a coarse-granularity path basis. This enables achievement of a low-delay and low-power-consumption optical communication system as a communication infrastructure between large-scale data centers. As a coarse-granularity switching device, for example, a reconfigurable optical add drop multiplexer (ROADM) can be used.

As a technique by which a large-capacity traffic can be accommodated with high frequency use efficiency, there is an elastic optical communication technique (for example, see PTL 3). In an optical communication system employing the elastic optical communication technique, by varying the number of occupied wavelength slots of an optical path according to an optical signal quality degradation amount of an accommodating route, frequency use efficiency can be improved in comparison with an optical communication system using a fixed grid. Further, an optical transmitter/receiver conforming to the elastic optical communication technique is able to transmit/receive an optical path having the variable number of occupied slots according to an optical signal quality degradation amount. Thus, an optical path can be accommodated in both a terrestrial optical communication system and a submarine optical communication system by using an optical transmitter/receiver of an identical configuration. With the above configuration, an optical path sent by a terrestrial node device included in a terrestrial optical communication system can be allocated to a submarine optical communication system through switching control performed by a coarse-granularity switching device introduced to a landing station.

However, a terrestrial/submarine connected optical communication system that performs switching control on a coarse-granularity path basis by using a coarse-granularity switching device has an issue described as follows.

First, in a terrestrial/submarine separated optical communication system, even when an optical path is allocated to different accommodating wavelength slot numbers between a terrestrial section optical path and a submarine section optical path, wavelength conversion is possible since the optical path is terminated at a landing station. Thus, even in this case, a requested service can be accommodated.

However, in the case of a terrestrial/submarine connected optical communication system, a coarse-granularity switching device introduced to a landing station is unable to convert a wavelength of an optical path. Thus, it is necessary that an accommodating wavelength slot number of a terrestrial optical communication system and an accommodating wavelength slot number of a submarine optical communication system be identical. Therefore, it is necessary to adjust an optical path setting value accommodating a requested traffic in such a way that the number of required wavelength slots and an accommodating wavelength slot number of an optical path are identical between a terrestrial optical path setting device and a submarine optical path setting device.

Second, in a terrestrial/submarine connected optical communication system, since a configuration is made in which a coarse-granularity switching device is introduced to a landing station, additional degradation is generated in a transmission characteristic of an optical path passing through the landing station. Therefore, a terrestrial optical path setting device needs to recognize the additional transmission characteristic degradation, and needs to determine the number of required wavelength slots in consideration of the additional transmission characteristic degradation.

Third, in a submarine optical communication system, there is limitation on the maximum power that can be supplied to a submarine cable. Thus, a gain of an optical amplifier included in the submarine optical communication system is limited, and this determines an upper limit value for signal strength of an optical path. Therefore, a terrestrial optical path setting device needs to determine the number of required wavelength slots, based on the upper limit value for signal strength in the submarine optical communication system.

Because of presence of the above-described issue, in a terrestrial/submarine connected optical communication system, an available wavelength slot region where an optical path can be allocated is insufficient and an arrival performance of the optical path is unachieved, which results in an increased rate of failing in allocation of an optical path accommodating a requested traffic. Consequently, use efficiency of the optical communication system decreases, and this increases a running cost of the optical communication system.

As described above, there has been a problem that a rate of failing in allocation of an optical path increases in a configuration in which a terrestrial optical communication system and a submarine optical communication system are connected by introducing a coarse-granularity switching device.

An object of the present invention is to provide an optical path setting device, an optical communication system, and an optical path setting method that solve the above-described issue that a rate of failing in allocation of an optical path increases in a configuration in which a terrestrial optical communication system and a submarine optical communication system are connected by introducing a coarse-granularity switching device.

Solution to Problem

An optical path setting device according to the present invention includes: a transmission characteristic calculating means for calculating an inter-endpoint transmission characteristic being a transmission characteristic between endpoints of an optical path accommodating traffic in a plurality of optical communication systems; a required wavelength bandwidth determining means for determining, based on the inter-endpoint transmission characteristic, a required wavelength bandwidth being a wavelength bandwidth meeting an arrival performance of the optical path; and an accommodating wavelength band determining means for determining, as an accommodating wavelength band for accommodating the optical path, a common wavelength band that is a wavelength band where the optical path having the required wavelength bandwidth can be allocated and that is common to the plurality of optical communication systems.

An optical communication system according to the present invention includes: a first optical communication system including a first optical path setting device and a first node device; a second optical communication system including a second optical path setting device and a second node device; and an integrated optical path setting device controlling the first optical path setting device and the second optical path setting device, wherein the integrated optical path setting device includes: a transmission characteristic calculating means for calculating an inter-endpoint transmission characteristic being a transmission characteristic between endpoints of an optical path accommodating traffic in a plurality of optical communication systems including the first optical communication system and the second optical communication system; a required wavelength bandwidth determining means for determining, based on the inter-endpoint transmission characteristic, a required wavelength bandwidth being a wavelength bandwidth meeting an arrival performance of the optical path; and an accommodating wavelength band determining means for determining, as an accommodating wavelength band for accommodating the optical path, a common wavelength band that is a wavelength band where the optical path having the required wavelength bandwidth can be allocated and that is common to the plurality of optical communication systems.

An optical path setting method according to the present invention includes: calculating an inter-endpoint transmission characteristic being a transmission characteristic between endpoints of an optical path accommodating traffic in a plurality of optical communication systems; determining, based on the inter-endpoint transmission characteristic, a required wavelength bandwidth being a wavelength bandwidth meeting an arrival performance of the optical path; and determining, as an accommodating wavelength band for accommodating the optical path, a common wavelength band that is a wavelength band where the optical path having the required wavelength bandwidth can be allocated and that is common to the plurality of optical communication systems.

A program according to the present invention causes a computer to function as: a transmission characteristic calculating means for calculating an inter-endpoint transmission characteristic being a transmission characteristic between endpoints of an optical path accommodating traffic in a plurality of optical communication systems; a required wavelength bandwidth determining means for determining, based on the inter-endpoint transmission characteristic, a required wavelength bandwidth being a wavelength bandwidth meeting an arrival performance of the optical path; and an accommodating wavelength band determining means for determining, as an accommodating wavelength band for accommodating the optical path, a common wavelength band that is a wavelength band where the optical path having the required wavelength bandwidth can be allocated and that is common to the plurality of optical communication systems.

Advantageous Effects of Invention

The optical path setting device, the optical communication system, and the optical path setting method according to the present invention are able to increase an opening probability of an optical path, even in a configuration in which a terrestrial optical communication system and a submarine optical communication system are connected by introducing a coarse-granularity switching device.

BRIEF DESCRIPTION OF DRAWINGS

FIG. 7 is a block diagram illustrating a configuration of the terrestrial/submarine integrated optical communication system according to the second example embodiment of the present invention, and is a diagram for describing a procedure for calculating a transmission characteristic of an optical path.

FIG. 8A is a diagram illustrating characteristic parameters for calculating a transmission characteristic of an optical path in the terrestrial/submarine integrated optical communication system according to the second example embodiment of the present invention.

FIG. 8B is a diagram illustrating characteristic parameters for calculating a transmission characteristic of an optical path in the terrestrial/submarine integrated optical communication system according to the second example embodiment of the present invention.

FIG. 14A is a diagram illustrating characteristic parameters for calculating a transmission characteristic of an optical path in the terrestrial/submarine integrated optical communication system according to the third example embodiment of the present invention.

FIG. 14B is a diagram illustrating characteristic parameters for calculating a transmission characteristic of an optical path in the terrestrial/submarine integrated optical communication system according to the third example embodiment of the present invention.

FIG. 15 is a block diagram illustrating other configurations of the integrated optical path setting device, the terrestrial optical path setting device, and a submarine optical path setting device included in the terrestrial/submarine integrated optical communication system according to the third example embodiment of the present invention.

EXAMPLE EMBODIMENT

Hereinafter, example embodiments of the present invention will be described with reference to the drawings.

First Example Embodiment

Figure 1:
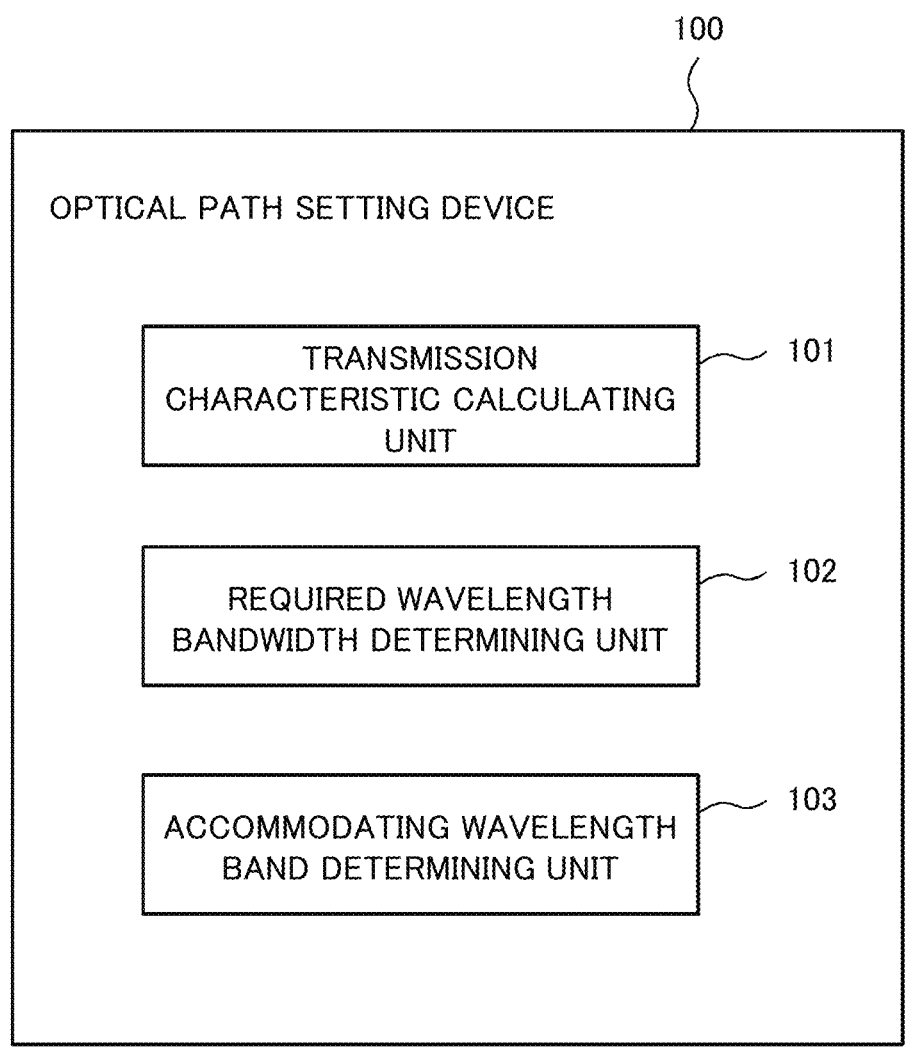
FIG. 1 is a block diagram illustrating a configuration of an optical path setting device according to a first example embodiment of the present invention.

FIG. 1 is a block diagram illustrating a configuration of an optical path setting device 100 according to a first example embodiment of the present invention. The optical path setting device 100 includes a transmission characteristic calculating unit (a transmission characteristic calculating means) 101, a required wavelength bandwidth determining unit (a required wavelength bandwidth determining means) 102, and an accommodating wavelength band determining unit (an accommodating wavelength band determining means) 103.

The transmission characteristic calculating unit 101 calculates an inter-endpoint transmission characteristic that is a transmission characteristic between endpoints of an optical path accommodating traffic in a plurality of optical communication systems. The required wavelength bandwidth determining unit 102 determines, based on the inter-endpoint transmission characteristic, a required wavelength bandwidth that is a wavelength bandwidth meeting an arrival performance of the optical path. Then, the accommodating wavelength band determining unit 103 determines, as an accommodating wavelength band for accommodating the optical path, a common wavelength band that is a wavelength band where the optical path having the required wavelength bandwidth can be allocated and that is common to the plurality of optical communication systems.

Herein, the transmission characteristic calculating unit 101 may be configured to totalize a transmission characteristic of the optical path in an individual optical communication system included in the plurality of optical communication systems, and calculate the inter-endpoint transmission characteristic by considering degradation of the transmission characteristic caused by connecting the plurality of optical communication systems.

The above-described plurality of optical communication systems may be configured to include a terrestrial optical communication system in which an optical fiber transmission line constituting the optical communication system is laid only on land, and a submarine optical communication system in which an optical fiber transmission line constituting the optical communication system is accommodated in a submarine cable. At this time, the plurality of optical communication systems may be connected by switching a route on a path basis. Specifically, a configuration may be made in which the terrestrial optical communication system and the submarine optical communication system are connected by a coarse-granularity switching device (a coarse-granularity switching means).

As described above, the optical path setting device 100 according to the present example embodiment is configured to determine a required wavelength bandwidth, based on an inter-endpoint transmission characteristic. This enables determination of a required wavelength bandwidth in consideration of degradation of a transmission characteristic caused by introducing a coarse-granularity switching device. Further, the optical path setting device 100 according to the present example embodiment is configured to allocate an optical path having the required wavelength bandwidth to a common wavelength band common to a plurality of optical communication systems. Therefore, a wavelength band where an optical path can be allocated can be prevented from being insufficient in any of the optical communication systems, and an arrival performance of the optical path can be prevented from being unachieved.

Next, an optical path setting method according to the present example embodiment will be described.

In the optical path setting method according to the present example embodiment, first, an inter-endpoint transmission characteristic that is a transmission characteristic between endpoints of an optical path accommodating traffic in a plurality of optical communication systems is calculated. Based on the inter-endpoint transmission characteristic, a required wavelength bandwidth that is a wavelength bandwidth meeting an arrival performance of the optical path is determined. Then, a common wavelength band that is a wavelength band where the optical path having the required wavelength bandwidth can be allocated and that is common to the plurality of optical communication systems is determined as an accommodating wavelength band for accommodating the optical path.

Herein, a configuration may be made in which the above-described calculating of the inter-endpoint transmission characteristic includes totalizing a transmission characteristic of the optical path in an individual optical communication system included in the plurality of optical communication systems, and calculating the inter-endpoint transmission characteristic by considering degradation of the transmission characteristic caused by connecting the plurality of optical communication systems.

The above-described steps may be executed by a computer. In other words, a program for causing a computer to function as a transmission characteristic calculating means, a required wavelength bandwidth determining means, and an accommodating wavelength band determining means may be used. Herein, the transmission characteristic calculating means calculates an inter-endpoint transmission characteristic that is a transmission characteristic between endpoints of an optical path accommodating traffic in a plurality of optical communication systems. The required wavelength bandwidth determining means determines, based on the inter-endpoint transmission characteristic, a required wavelength bandwidth that is a wavelength bandwidth meeting an arrival performance of the optical path. Then, the accommodating wavelength band determining means determines, as an accommodating wavelength band for accommodating the optical path, a common wavelength band that is a wavelength band where the optical path having the required wavelength bandwidth can be allocated and that is common to the plurality of optical communication systems.

At this time, the transmission characteristic calculating means may be configured to totalize a transmission characteristic of the optical path in an individual optical communication system included in the plurality of optical communication systems, and calculate the inter-endpoint transmission characteristic by considering degradation of the transmission characteristic caused by connecting the plurality of optical communication systems.

The above-described transmission characteristic may be calculated by combining any of a level diagram design value, a wavelength bandwidth, a center wavelength, a guard band bandwidth, the number of stages of pass-through node devices, and an optical fiber design value of the optical path.

As described above, the optical path setting device 100, the optical path setting method, and the program according to the present example embodiment are able to increase an opening probability of an optical path, even in a configuration in which a terrestrial optical communication system and a submarine optical communication system are connected by introducing a coarse-granularity switching device.

Second Example Embodiment

Next, a second example embodiment of the present invention will be described. In the present example embodiment, an optical communication system using the optical path setting device 100 according to the first example embodiment will be described. Herein, the optical communication system according to the present example embodiment includes a first optical communication system including a first optical path setting device and a first node device, a second optical communication system including a second optical path setting device and a second node device, and an integrated optical path setting device configured to control the first optical path setting device and the second optical path setting device.

The above-described first optical communication system may be one of a terrestrial optical communication system and a submarine optical communication system, and the second optical communication system may be another one of the terrestrial optical communication system and the submarine optical communication system. Herein, the terrestrial optical communication system is an optical communication system in which an optical fiber transmission line constituting the terrestrial optical communication system is laid only on land. The submarine optical communication system is an optical communication system in which an optical fiber transmission line constituting the submarine optical communication system is accommodated in a submarine cable.

Hereinafter, the optical communication system according to the present example embodiment will be described in detail.

Figure 2:
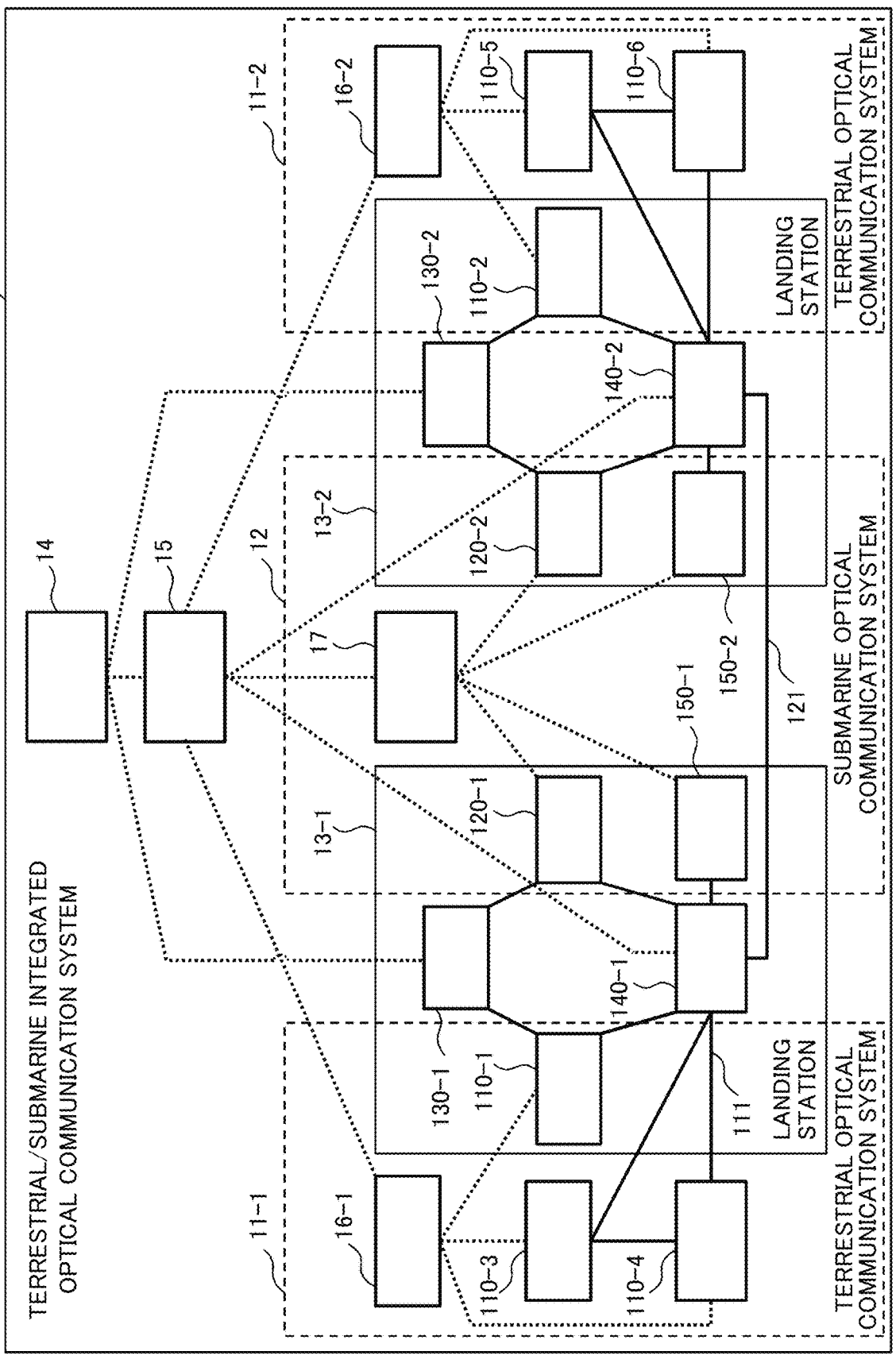
FIG. 2 is a block diagram illustrating a configuration of a terrestrial/submarine integrated optical communication system according to a second example embodiment of the present invention.

FIG. 2 illustrates a configuration of a terrestrial/submarine integrated optical communication system 10 according to the present example embodiment. As illustrated in FIG. 2, the terrestrial/submarine integrated optical communication system 10 includes terrestrial optical communication systems (first optical communication systems) 11-1 and 11-2, a submarine optical communication system (a second optical communication system) 12, landing stations (connecting means) 13-1 and 13-2, a requested service accommodating device 14, and an integrated optical path setting device 15. Herein, a case in which the terrestrial/submarine integrated optical communication system 10 includes two terrestrial optical communication systems 11-1 and 11-2 and two landing stations 13-1 and 13-2 will be described as an example. However, the number of terrestrial optical communication systems and the number of landing stations are not limited thereto. When devices and the like of an identical type do not need to be distinguished from each other, an index (−1, −2, etc.) will be omitted.

The terrestrial optical communication system 11 is constituted of a terrestrial optical path setting device (a first optical path setting device) 16 and terrestrial node devices (first node devices) 110. The terrestrial node devices 110 are connected by an optical fiber transmission line 111.

The submarine optical communication system 12 is constituted of a submarine optical path setting device (a second optical path setting device) 17, submarine node devices (second node devices) 120, and a submarine cable 121.

Figure 3:
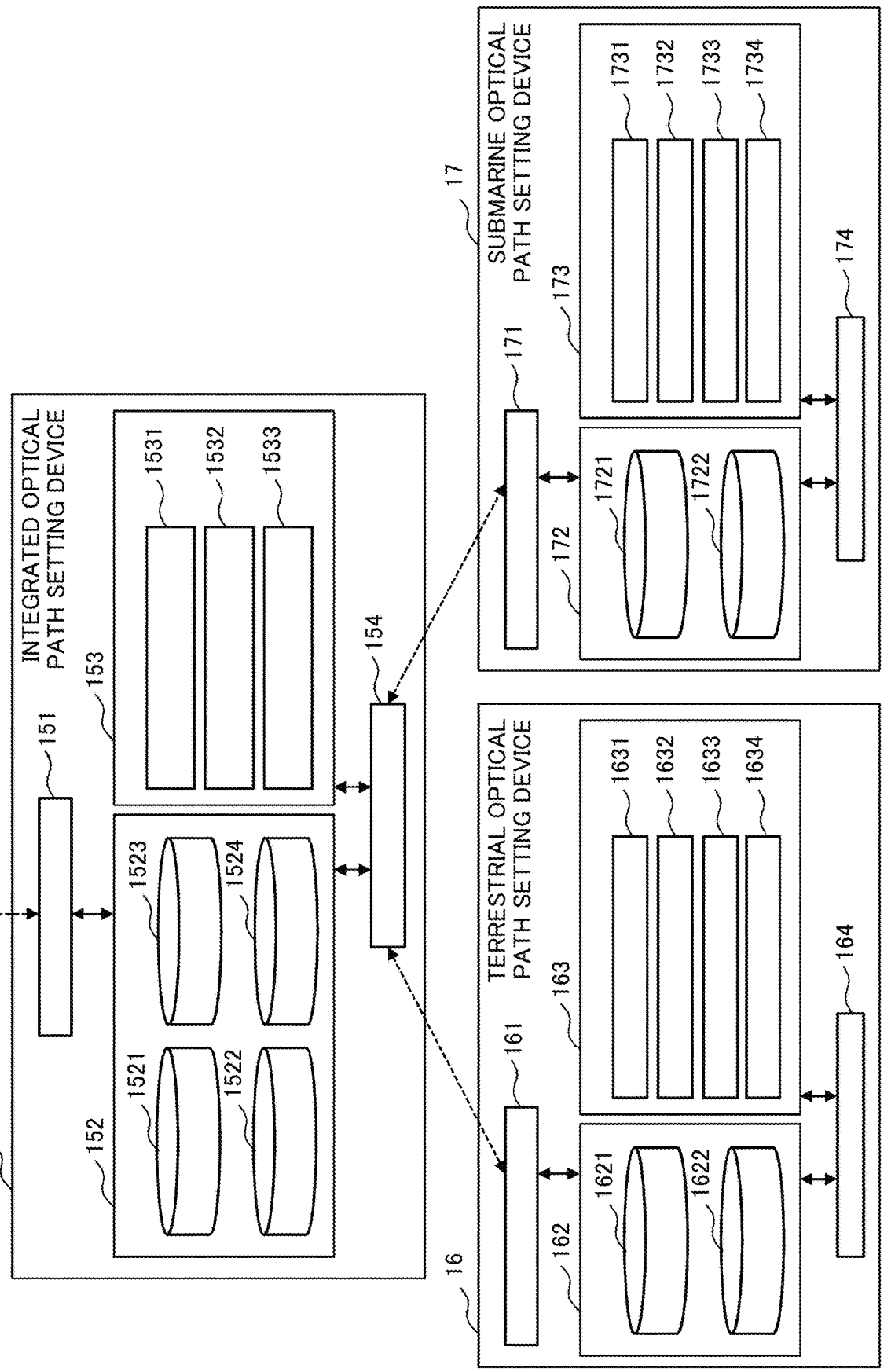
FIG. 3 is a block diagram illustrating configurations of an integrated optical path setting device, a terrestrial optical path setting device, and a submarine optical path setting device included in the terrestrial/submarine integrated optical communication system according to the second example embodiment of the present invention.

FIG. 3 illustrates configurations of the integrated optical path setting device 15, the terrestrial optical path setting device 16, and the submarine optical path setting device 17 according to the present example embodiment in further detail.

As illustrated in FIG. 3, the integrated optical path setting device 15 includes a traffic request receiving unit 151, an integrated optical communication system database (DB) unit 152, an optical path designing unit 153, and an optical path setting device communication unit 154.

The traffic request receiving unit 151 receives a service accommodation request from the requested service accommodating device 14.

The integrated optical communication system DB unit 152 includes an optical node device allocation information DB 1521, a landing station path allocation information DB 1522, a landing station device characteristic information DB 1523, and an optical path setting device reference information DB 1524. The optical node device allocation information DB 1521 holds and manages optical communication system information relating to an allocation destination of a node device. The landing station path allocation information DB 1522 holds and manages a setting parameter for an optical path to be allocated to the terrestrial optical communication system 11 and the submarine optical communication system 12 to be connected with the landing station 13. The landing station device characteristic information DB 1523 holds an amount of degradation of a transmission characteristic in a coarse-granularity switching device included in a landing station. The optical path setting device reference information DB 1524 stores optical path setting parameter information notified to the terrestrial optical path setting device 16 or the submarine optical path setting device 17 through the optical path setting device communication unit 154.

The optical path designing unit 153 includes a transmission characteristic totalizing unit 1531, a transmission propriety determining unit 1532, and an accommodating wavelength slot number determining unit 1533. The transmission characteristic totalizing unit (a transmission characteristic calculating means) 1531 calculates an end-to-end (inter-endpoint) transmission characteristic of a path passing through the landing station 13. The transmission propriety determining unit 1532 determines, based on the end-to-end transmission characteristic, propriety of path opening. The transmission propriety determining unit 1532 functions as a required wavelength bandwidth determining means. Then, the accommodating wavelength slot number determining unit (an accommodating wavelength band determining means) 1533 calculates a common portion of a wavelength slot number (a wavelength band), and determines a wavelength slot number capable of accommodating a path from end to end.

The optical path setting device communication unit 154 notifies the terrestrial optical path setting device 16 and the submarine optical path setting device 17 of optical path setting parameter information. Herein, the optical path setting parameter information includes a physical route, the number of required wavelength slots, and an accommodating wavelength slot number. The optical path setting parameter information may further include any of a wavelength dispersion compensation amount, nonlinear compensation amount, and a frequency characteristic filter coefficient value.

The terrestrial optical path setting device 16 includes a path setting information transmitting/receiving unit 161, a terrestrial optical communication system DB unit 162, a terrestrial section optical path designing unit 163, and a terrestrial node device communication unit 164.

The path setting information transmitting/receiving unit 161 transmits and receives optical path setting parameter information to and from the integrated optical path setting device 15.

The terrestrial optical communication system DB unit 162 includes a terrestrial section path allocation information DB 1621 and a terrestrial section topology DB 1622. The terrestrial section path allocation information DB 1621 records physical route information, a required wavelength slot width, and an accommodating wavelength slot number of an optical path to be accommodated in the terrestrial optical communication system 11. The terrestrial section topology DB 1622 records a connection relationship between the terrestrial node devices 110 arranged in the terrestrial optical communication system 11, a route length, a transmission characteristic, and a wavelength dispersion amount of the optical fiber transmission line 111 connecting between terrestrial nodes, and a physical constraint on a terrestrial node device. Examples of a physical constraint on a terrestrial node device include a wavelength constraint whereby a selectable route is limited for each wavelength, a route constraint whereby a selectable route is different depending on an input/output port of an optical path, a contention constraint whereby allocation of another optical path to an already allocated wavelength slot number is prohibited, and the like.

The terrestrial section optical path designing unit 163 includes a terrestrial route selecting unit 1631, a transmission characteristic calculating unit (a first transmission characteristic calculating means) 1632, a required wavelength slot determining unit 1633, and an accommodating wavelength slot number determining unit 1634. The terrestrial route selecting unit 1631 refers to the terrestrial section topology DB 1622, and selects the shortest route linking between a start terrestrial node device and an end terrestrial device of an optical path requested for setting. As the shortest route, not only a route with the shortest distance in a terrestrial section, but also a route with the best transmission characteristic, a route with the minimum number of pass-through nodes, the maximum flow route, i.e., a route with the maximum number of available wavelength slots, and the like may be selected. As a shortest route selection algorithm, Dijkstra method, integer linear programming method, a genetic algorithm method, and the like are known. These algorithms can be selectively used depending on a specification such as a scale of an optical communication system and route selection time. The transmission characteristic calculating unit 1632 calculates a transmission characteristic of the selected route. The required wavelength slot determining unit 1633 determines, based on the transmission characteristic calculated by the transmission characteristic calculating unit 1632, the number of wavelength slots (a wavelength bandwidth) required for accommodating the optical path. The accommodating wavelength slot number determining unit 1634 searches for an available wavelength slot for the number of required wavelength slots, and determines an allocable wavelength slot number.

The terrestrial node device communication unit 164 is connected with the terrestrial node devices 110, and notifies a connection-destination terrestrial node device of optical path setting parameter information.

The submarine optical path setting device 17 includes a path setting information transmitting/receiving unit 171, a submarine optical communication system DB unit 172, a submarine section optical path designing unit 173, and a submarine node device communication unit 174.

The path setting information transmitting/receiving unit 171 transmits and receives optical path setting parameter information to and from the integrated optical path setting device 15.

The submarine optical communication system DB unit 172 includes a submarine section path allocation information DB 1721 and a submarine section topology DB 1722. The submarine section path allocation information DB 1721 records physical route information, a required wavelength slot width, an accommodating wavelength slot number, a frequency grid interval, a guard band setting value, and the like of an optical path to be accommodated in the submarine optical communication system 12. The submarine section topology DB 1722 records a connection relationship between the submarine node devices 120 arranged in the submarine optical communication system 12, and a route length, a transmission characteristic, and a wavelength dispersion amount of the submarine cable 121 connecting between submarine nodes. The submarine section topology DB 1722 further records an output power upper limit value and a level diagram design value of an optical amplifier in the submarine cable 121, a physical constraint on a submarine node device, and the like.

The submarine section optical path designing unit 173 includes a submarine route selecting unit 1731, a transmission characteristic calculating unit (a second transmission characteristic calculating means) 1732, a required wavelength slot determining unit 1733, and an accommodating wavelength slot number determining unit 1734. The submarine route selecting unit 1731 refers to the submarine section topology DB 1722, and selects the shortest route in a submarine section linking between a start terrestrial node device and an end terrestrial device of an optical path requested for setting. The transmission characteristic calculating unit 1732 calculates a transmission characteristic of the route selected by the submarine route selecting unit 1731. The required wavelength slot determining unit 1733 determines, based on the transmission characteristic calculated by the transmission characteristic calculating unit 1732, the number of wavelength slots required for accommodating the optical path. Then, the accommodating wavelength slot number determining unit 1734 searches for an available wavelength slot for the number of required wavelength slots, and determines an allocable wavelength slot number.

The submarine node device communication unit 174 is connected with the submarine node devices 120, and notifies a connection-destination submarine node device of optical path setting parameter information.

Figure 4:
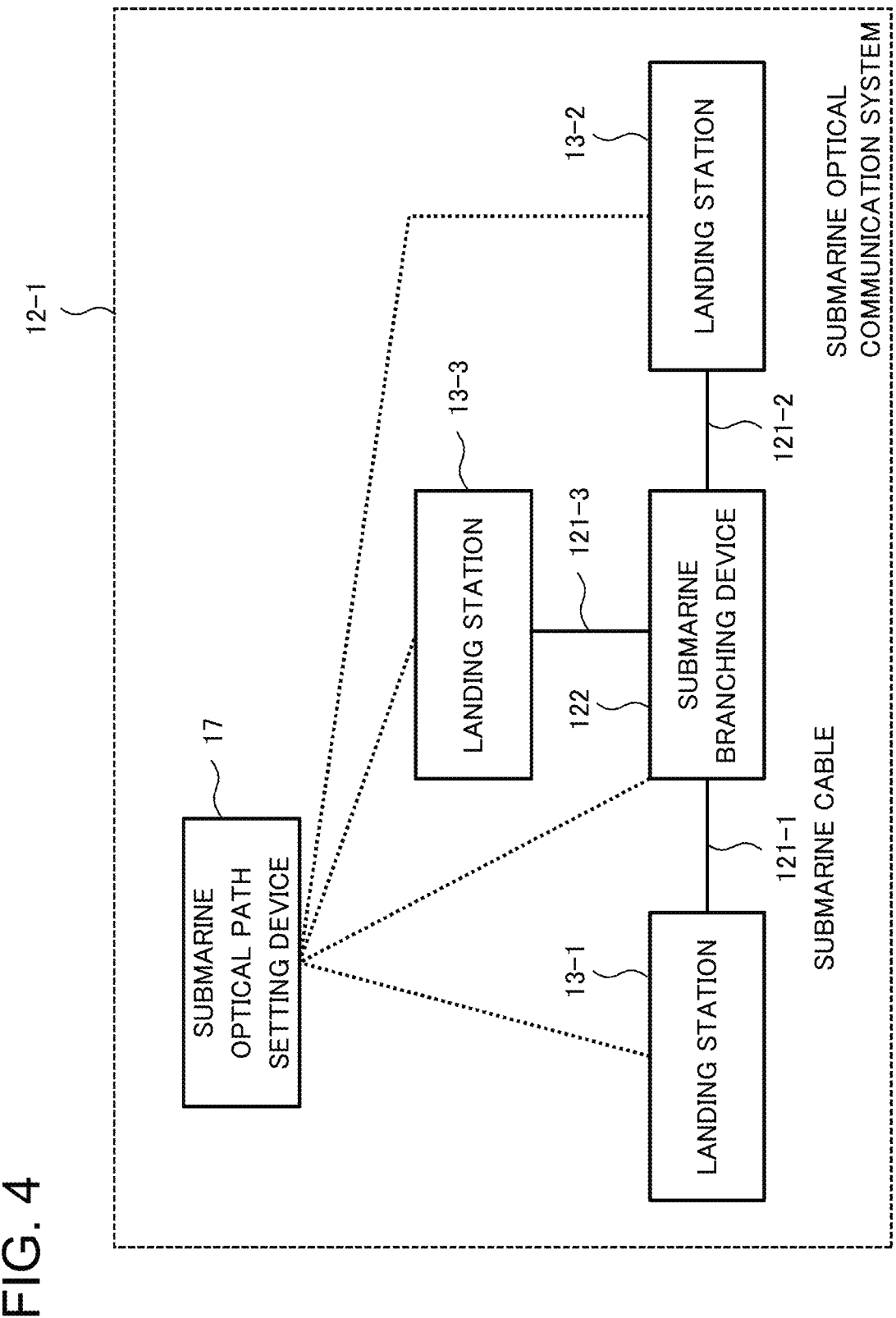
FIG. 4 is a block diagram illustrating another configuration of a submarine optical communication system included in the terrestrial/submarine integrated optical communication system according to the second example embodiment of the present invention.

FIG. 4 illustrates a configuration when a submarine optical communication system 12-1 includes a submarine branching device 122 in the middle of the submarine cable 121. The submarine optical branching device 122 is connected with a plurality of landing stations 13-1 to 13-3. Further, the submarine branching device 122 is connected with the submarine optical path setting device 17. When a route can be switched for each wavelength, the submarine optical path setting device 17 switches a route along an optical path route. When there is a wavelength constraint, the submarine optical path setting device 17 refers to a wavelength route recorded in the submarine section topology DB 1722, and constrains a wavelength slot number where an optical path is accommodated. This enables accommodation of an optical path even in a submarine optical communication system including a submarine branching device.

Figure 5:
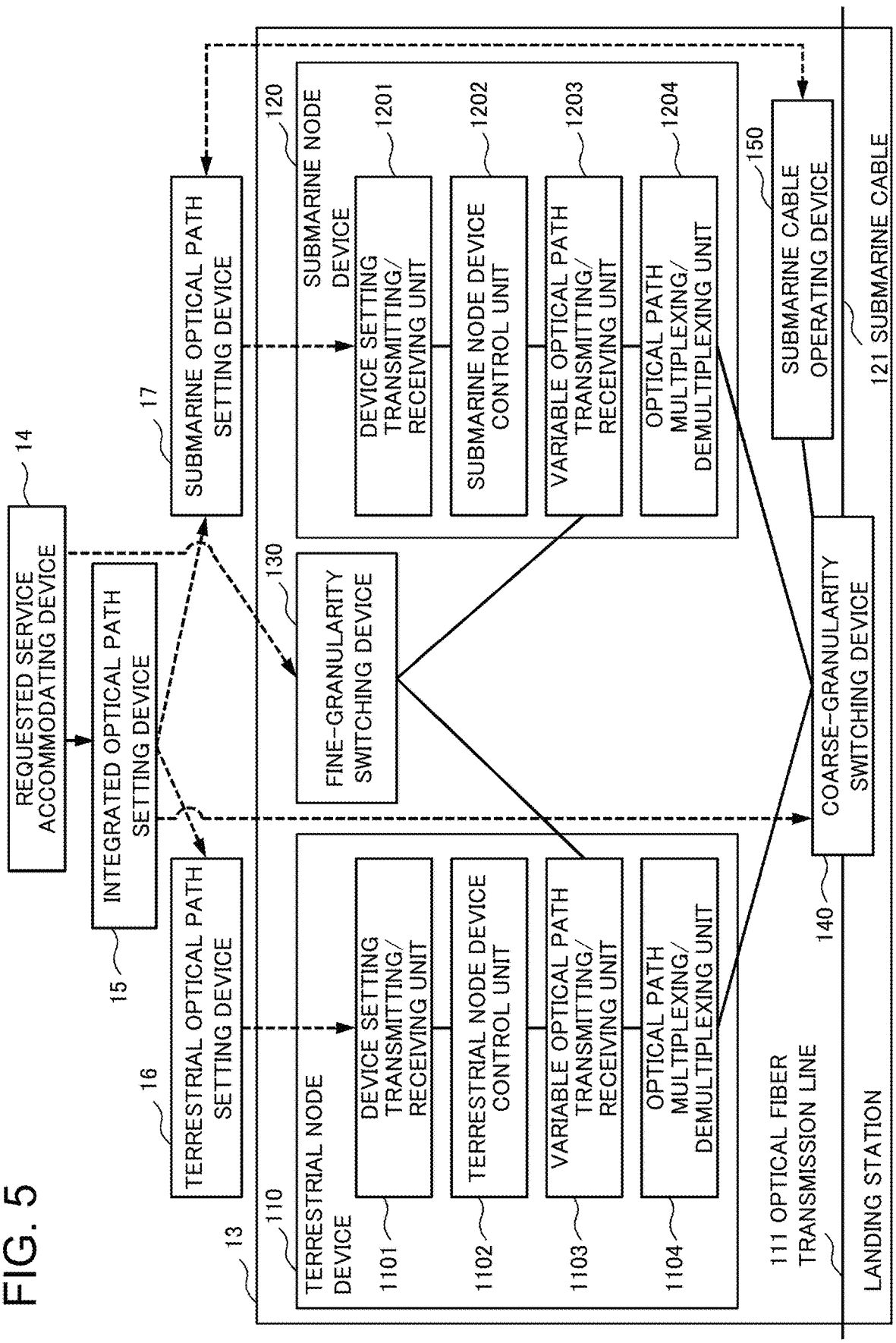
FIG. 5 is a block diagram illustrating a configuration of a landing station included in the terrestrial/submarine integrated optical communication system according to the second example embodiment of the present invention.

FIG. 5 illustrates a configuration of the landing station 13 according to the present example embodiment. The landing station 13 includes a terrestrial node device 110, a submarine node device 120, a fine-granularity switching device 130, and a coarse-granularity switching device (a coarse-granularity switching means) 140.

The terrestrial node device 110 includes a device setting transmitting/receiving unit 1101, a terrestrial node device control unit 1102, a variable optical path transmitting/receiving unit 1103, and an optical path multiplexing/demultiplexing unit 1104. The device setting transmitting/receiving unit 1101 is an interface with the terrestrial optical path setting device 16, and transmits and receives information relating to an optical path setting parameter. The terrestrial node device control unit 1102 controls, based on the optical path setting parameter, the variable optical path transmitting/receiving unit 1103 and the optical path multiplexing/demultiplexing unit 1104. The variable optical path transmitting/receiving unit 1103 sends, to the optical path multiplexing/demultiplexing unit 1104, signal light modulated based on a client signal constituting a requested traffic. The optical path multiplexing/demultiplexing unit 1104 connects the signal light to the coarse-granularity switching device 140.

The submarine node device 120 includes a device setting transmitting/receiving unit 1201, a submarine node device control unit 1202, a variable optical path transmitting/receiving unit 1203, and an optical path multiplexing/demultiplexing unit 1204. The device setting transmitting/receiving unit 1201 is an interface with the submarine optical path setting device 17, and transmits and receives information relating to an optical path setting parameter. The submarine node device control unit 1202 controls, based on the optical path setting parameter, the variable optical path transmitting/receiving unit 1203 and the optical path multiplexing/demultiplexing unit 1204. The variable optical path transmitting/receiving unit 1203 sends, to the optical path multiplexing/demultiplexing unit 1204, signal light modulated based on a client signal constituting a requested traffic. The optical path multiplexing/demultiplexing unit 1204 connects the signal light to the coarse-granularity switching device 140.

The fine-granularity switching device 130 selects, based on priority relating to multiplexing of requested traffics notified by the requested service accommodating device 14, requested traffics to be multiplexed. Then, the fine-granularity switching device 130 sends the multiplexed requested traffics to the optical path multiplexing/demultiplexing unit via the variable optical path transmitting/receiving unit 1103 or 1203 included in the terrestrial node device 110 or the submarine node device 120.

The coarse-granularity switching device 140 is connected with the terrestrial node device 110, the submarine node device 120, an optical fiber transmission line 111, and a submarine cable 121. Then, the coarse-granularity switching device 140 switches, based on optical path route information notified by the integrated optical path setting device 15, a route of an optical path sent from the terrestrial node device 110 and the submarine node device 120 on an optical path basis. As a coarse-granularity switching device, for example, any of a reconfigurable optical add drop multiplexer (ROADM), an optical switch, and a wavelength selection switch can be employed.

A submarine cable operating device 150 is connected with the submarine cable 121 via the coarse-granularity switching device 140, supplies power to the submarine cable, and monitors a state of the submarine cable. Further, the submarine cable operating device 150 notifies the submarine optical path setting device 17 of operation information.

Figure 6:
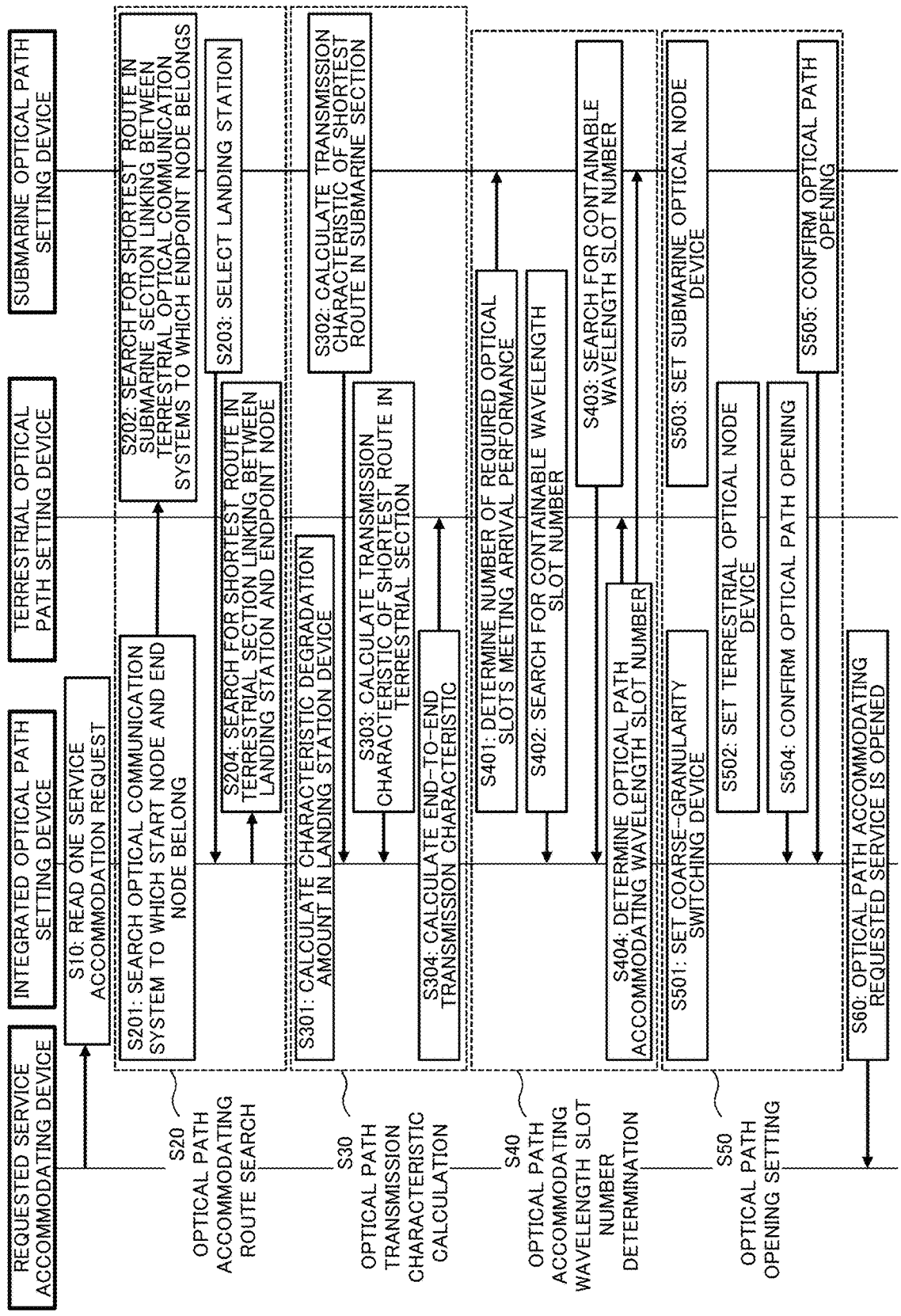
FIG. 6 is a sequence diagram for describing an operation of the terrestrial/submarine integrated optical communication system according to the second example embodiment of the present invention.

Next, an operation of the terrestrial/submarine integrated optical communication system 10 according to the present example embodiment will be described. FIG. 6 is a sequence diagram for describing the operation of the terrestrial/submarine integrated optical communication system 10 according to the present example embodiment.

First, the integrated optical path setting device 15 reads, from the requested service accommodating device 14, one request for service accommodation in the terrestrial/submarine integrated optical communication system (Step S10). In order to open an optical path accommodating the service accommodation request, the terrestrial/submarine integrated optical communication system 10 executes the following procedures. In other words, procedures for optical path accommodating route search (Step S20), optical path transmission characteristic calculation (Step S30), optical path accommodating wavelength slot number determination (Step S40), and optical path opening setting (Step S50) are executed. Finally, the integrated optical path setting device 15 notifies the requested service accommodating device 14 of opening of the optical path accommodating the requested service (Step S60).

Each of the procedures (Steps S20 to S50) will be described below in detail.

In the optical path accommodating route search (Step S20), the integrated optical path setting device 15 searches, based on the notified service accommodation request, the terrestrial optical communication system 11 or the submarine optical communication system 12 to which a start node and an end node of a requested service belong (Step S201). At this time, the integrated optical path setting device 15 refers to the optical node device allocation information DB 1521. As a result of search, when the start node and the end node belong to different terrestrial optical communication systems, the submarine route selecting unit 1731 included in the submarine optical path setting device 17 searches for the shortest route in a submarine section linking between the terrestrial optical communication systems (Step S202). The submarine optical path setting device 17 selects, regarding the searched shortest route, a landing station with which the terrestrial optical communication system is connected, and notifies the integrated optical path setting device 15 of the selected landing station (S203). The integrated optical path setting device 15 having received notification of landing station selection notifies the terrestrial optical path setting device 16 of the terrestrial optical communication system including the landing station. The terrestrial route selecting unit 1631 included in the terrestrial optical path setting device 16 having received the notification searches for the shortest route linking between the landing station and the start node or the end node (Step S204). With the above-described procedure, a route of the optical path accommodating the requested service is calculated.

Then, in the optical path transmission characteristic calculation (Step S30), the integrated optical path setting device 15 refers to the landing station device characteristic information DB 1523, and calculates a characteristic degradation amount generated by the coarse-granularity switching device 140 included in the landing station 13 (Step S301). The transmission characteristic calculating unit 1732 included in the submarine optical path setting device 17 calculates a transmission characteristic of the shortest route of the optical path accommodating the requested service in the submarine optical communication system 12. Then, the submarine optical path setting device 17 stores the herein-calculated transmission characteristic in the optical path setting device reference information DB 1524 included in the integrated optical path setting device 15 (Step S302). Similarly, the transmission characteristic calculating unit 1632 included in the terrestrial optical path setting device 16 calculates a transmission characteristic of the shortest route of the optical path accommodating the requested service in the terrestrial optical communication system 11. Then, the terrestrial optical path setting device 16 stores the herein-calculated transmission characteristic in the optical path setting device reference information DB 1524 included in the integrated optical path setting device 15 (Step S303). The transmission characteristic totalizing unit 1531 included in the integrated optical path setting device 15 calculates a transmission characteristic between the start node and the end node (an end-to-end transmission characteristic) (Step S304).

Herein, the above-described transmission characteristic of the optical path calculated by each of the submarine optical path setting device 17, the terrestrial optical path setting device 16, and the integrated optical path setting device 15 indicates an estimated value of a bit error rate in the case of transmitting the optical path to a transmission line. The transmission characteristic is also called a generalized optical signal to noise ratio (G-OSNR). Specifically, the transmission characteristic of the optical path is calculated by combining any of a level diagram design value, a wavelength bandwidth, a center wavelength, a guard band bandwidth, the number of stages of pass-through node devices, and an optical fiber design value of the optical path. Herein, the level diagram design value includes a span input power, the number of stages of optical amplifiers, a gain of an optical amplifier, a noise figure of an optical amplifier, and a span length.

An end-to-end transmission characteristic $Q_{E2E}$[dB] to be calculated by the integrated optical path setting device 15 is calculated by using the following expression. Herein, $Q_{ter}$[dB] represents a transmission characteristic of the optical path in a terrestrial section, $Q_{sub}$[dB] represents a transmission characteristic of the optical path in a submarine section, and $\Delta Q_{LS}$[dB] represents degradation in a landing station. As described above, the integrated optical path setting device 15 totalizes a transmission characteristic of the optical path in the terrestrial section (a first transmission characteristic) and a transmission characteristic of the optical path in the submarine section (a second transmission characteristic), and calculates the inter-endpoint transmission characteristic $Q_{E2E}$ by considering degradation of the transmission characteristic in the landing station (a connecting means).

$$Q_{E2E} = -\Delta Q_{LS} - 10\log_{10}(10^{-Q_{ter}/10} + 10^{-Q_{sub}/10})$$

In the above expression, a transmission characteristic in each optical communication system is the above-described G-OSNR, and the end-to-end transmission characteristic $Q_{E2E}$ is a sum of the G-OSNRs and thus, is calculated as a combination of decibels. Meanwhile, degradation of a transmission characteristic in a landing station is a sum of decibels, since a difference between transmission characteristic values upon input and output to and from the landing station is written in decibels.

When an optical path straddles a plurality of terrestrial sections, submarine sections, and landing stations, transmission characteristics thereof may be summed up.

With the above-described procedure, a transmission characteristic of the optical path accommodating the requested service is calculated. The integrated optical path setting device 15 notifies the terrestrial optical path setting device 16 of the herein-calculated end-to-end transmission characteristic (Step S304).

Next, a procedure for the optical path accommodating wavelength slot number determination (Step S40) will be described. The required wavelength slot determining unit 1633 included in the terrestrial optical path setting device 16 determines, based on the end-to-end transmission characteristic $Q_{E2E}$ notified by the integrated optical path setting device 15 (Step S304), the number of required optical slots (a required wavelength bandwidth) meeting an arrival performance of the optical path. Then, the herein-determined number of required optical slots is notified to the submarine optical path setting device 17 (Step S401). When determining the number of required optical slots, the required wavelength slot determining unit 1633 considers a transmission margin. Herein, the arrival performance of the optical path is determined from a reception bit error rate of the optical path, and is determined according to whether a transmission characteristic including the transmission margin is achieved or unachieved. Further, the arrival performance of the optical path may be determined also from the G-OSNR being an estimated value of a reception bit error rate.

The accommodating wavelength slot number determining unit 1634 included in the terrestrial optical path setting device 16 searches for, regarding the optical fiber transmission line 111 on the shortest route, an available wavelength slot capable of accommodating the optical path having bands of the determined number of required wavelength slots. Then, the terrestrial optical path setting device 16 notifies the integrated optical path setting device 15 of an accommodating wavelength slot number acquired as a result of search (Step S402). Similarly, the accommodating wavelength slot number determining unit 1734 included in the submarine optical path setting device 17 searches for, regarding the submarine cable 121 on the shortest route, an available wavelength slot capable of accommodating the optical path having bands of the determined number of required slots. Then, the submarine optical path setting device 17 notifies the integrated optical path setting device 15 of an accommodating wavelength slot number acquired as a result of search (Step S403).

The accommodating wavelength slot number determining unit 1533 included in the integrated optical path setting device 15 extracts a common portion of a containable wavelength slot number in each optical communication system, executes allocation of the optical path to the common portion, and determines an accommodating wavelength slot number (an accommodating wavelength band) for allocating the optical path (Step S404). When extracting the common portion of the wavelength slot number, the accommodating wavelength slot number determining unit 1533 may refer to the landing station path allocation information DB 1522. When executing allocation of the optical path, for example, a first-fit allocation scheme, a most-used allocation scheme, a least-used allocation scheme, or the like may be used. The integrated optical path setting device 15 notifies the terrestrial optical path setting device 16 and the submarine optical path setting device 17 of the determined accommodating wavelength slot number (Step S404).

Subsequently, in the optical path opening setting (Step S50), the integrated optical path setting device 15 sets, via the optical path setting device communication unit 154, a route of the coarse-granularity switching device 140 included in the landing-station 13 (Step S501). The terrestrial optical path setting device 16 sets, via the terrestrial node device communication unit 164, the terrestrial node device 110, based on the notified accommodating wavelength slot number (Step S502). Similarly, the submarine optical path setting device 17 sets, via the submarine node device communication unit 174, the submarine node device 120, based on the notified accommodating wavelength slot number (Step S503). When it can be confirmed that the optical path is opened, the terrestrial node device 110 and the submarine optical node device 120 notify the integrated optical path setting device 15 of the optical path opening, via the terrestrial optical path setting device 16 and the submarine optical path setting device 17 (Steps S504 and S505). Finally, when the integrated optical path setting device 15 notifies the requested service accommodating device 14 of notification of the optical path opening, an operation of opening the optical path accommodating the requested service is completed (Step S60).

Figure 7:
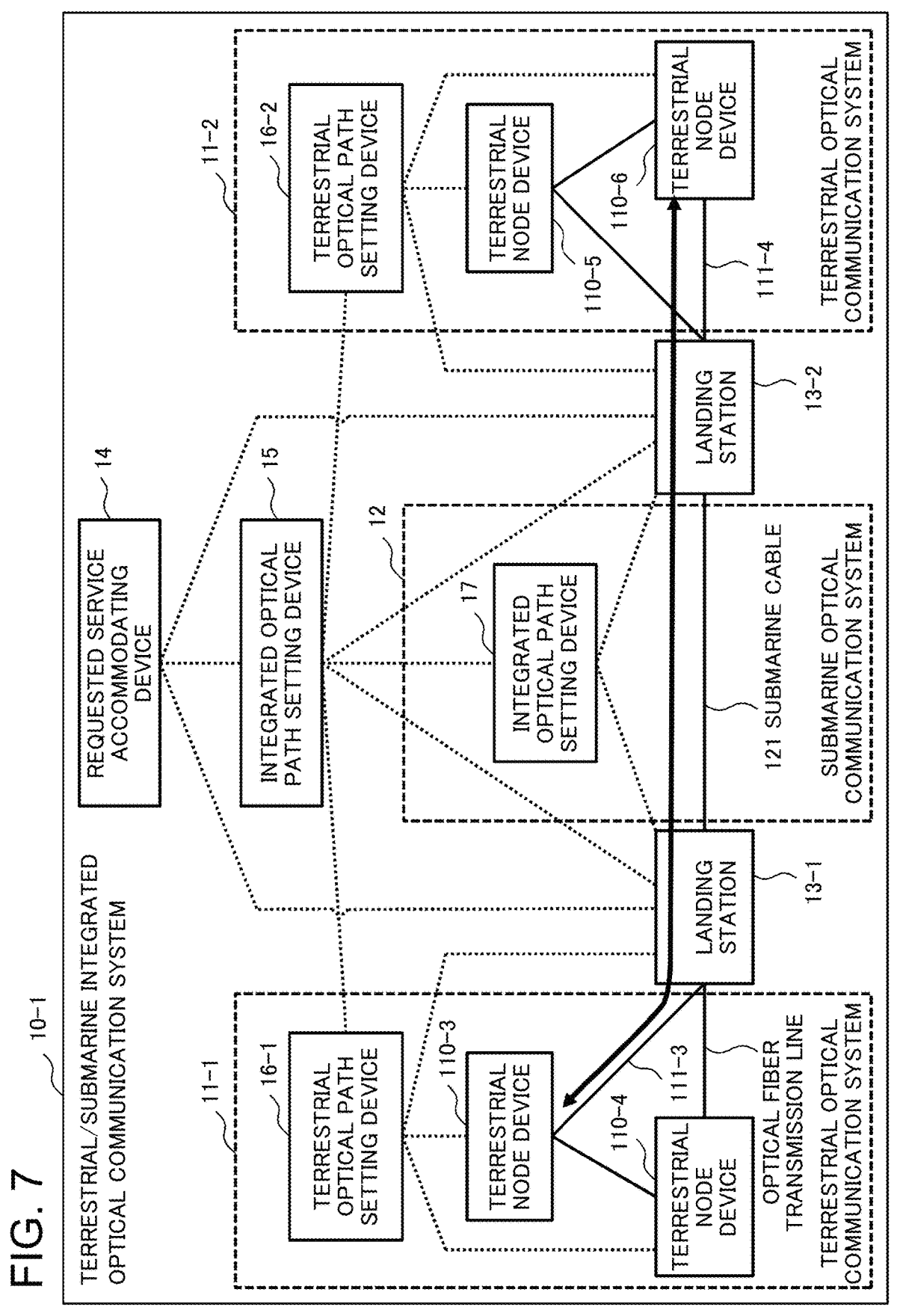

Next, a procedure for calculating a transmission characteristic of an optical path in the terrestrial/submarine integrated optical communication system according to the present example embodiment will be described in further detail by using FIG. 7. Herein, as illustrated in FIG. 7, a case in which an optical path accommodating a requested traffic between two terrestrial node devices 110-3 and 110-6 is opened will be described as an example.

The integrated optical path setting device 15 recognizes that the terrestrial node devices 110-3 and 110-6 are allocated to the terrestrial optical communication systems 11-1 and 11-2, respectively, by referring to the optical node device allocation information DB 1521. In the submarine optical communication system 12 connecting between the terrestrial optical communication systems 11-1 and 11-2, the submarine optical path setting device 17 searches for the shortest route, and selects the submarine cable 121 as the shortest route. The terrestrial optical path setting devices 16-1 and 16-2 determine that shortest routes to the terrestrial node devices 110-3 and 110-6 from the landing stations 13-1 and 13-2 with which the submarine cable 121 is connected are the optical fiber transmission lines 111-3 and 111-4, respectively. Herein, in order that the integrated optical path setting device 15 calculates a transmission characteristic of an optical path, the integrated optical path setting device 15 needs to acquire transmission characteristics of the optical fiber transmission lines 111-3 and 111-4 and the submarine cable 112, and characteristic degradation in the coarse-granularity switching devices included in the landing stations 13-1 and 13-2.

FIGS. 8A and 8B illustrate one example of characteristic parameters for calculating a transmission characteristic of an optical path. When the characteristic parameters illustrated in FIGS. 8A and 8B are used, an end-to-end transmission characteristic $Q_{E2E}$[dB] can be calculated as follows.

$$Q_{E2E} = -0.2 - 0.2 - 10\ \log_{10}(10^{-28.0/10} + 10^{-23.0/10} + 10^{-18.0/10}) = 16.5\ [dB]$$

Figure 9:
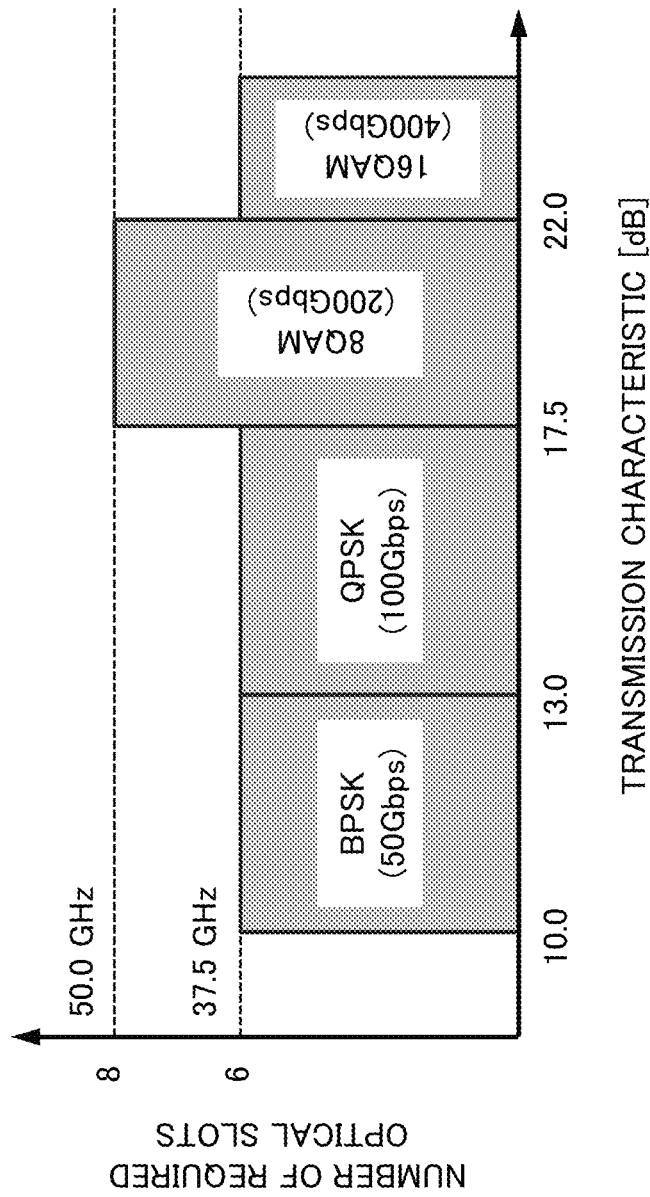
FIG. 9 is a diagram illustrating a setting range of a variable optical path transmitting/receiving unit included in the terrestrial/submarine integrated optical communication system according to the second example embodiment of the present invention.

Herein, when margin setting values in the optical communication systems are considered and the maximum value (3.0 dB) among the margin setting values is used, a transmission characteristic necessary for opening an optical path is 13.5 dB. FIG. 9 illustrates a setting range of the variable optical path transmitting/receiving units 1103 and 1203 included in the terrestrial node devices 111-3 and 111-4. From FIG. 9, when a transmission characteristic is 13.5 dB, the variable optical path transmitting/receiving units 1103 and 1203 can select, as a modulation scheme, a binary phase shift keying (BPSK) scheme or a quadrature phase shift keying (QPSK) scheme. In this case, the QPSK scheme having higher frequency use efficiency may be selected.

As described above, in the terrestrial/submarine integrated optical communication system 10 according to the present example embodiment, introduction of the integrated optical path setting device 15 enables sharing of optical path setting information and transmission line design information between the terrestrial optical path setting device 16 and the submarine optical path setting device 17. Then, a configuration is made in which an optical path setting parameter (an optical path setting value) is determined based on these pieces of shared information, and, based on the optical path setting parameter, each of the node devices sends an optical path. This enables improvement of an opening probability of an optical path.

In other words, the terrestrial/submarine integrated optical communication system 10 and the integrated optical path setting device 15 according to the present example embodiment are able to increase an opening probability of an optical path, even in a configuration in which a terrestrial optical communication system and a submarine optical communication system are connected by introducing a coarse-granularity switching device.

Third Example Embodiment

Next, a third example embodiment of the present invention will be described. The present example embodiment has a configuration in which an optical path setting device further includes a redesign determining means for comparing a common wavelength band with a required wavelength bandwidth, and, when the common wavelength band is insufficient for the required wavelength bandwidth, determining to perform redesigning of an optical path.

Hereinafter, an optical communication system according to the present example embodiment will be described in detail.

Figure 10:
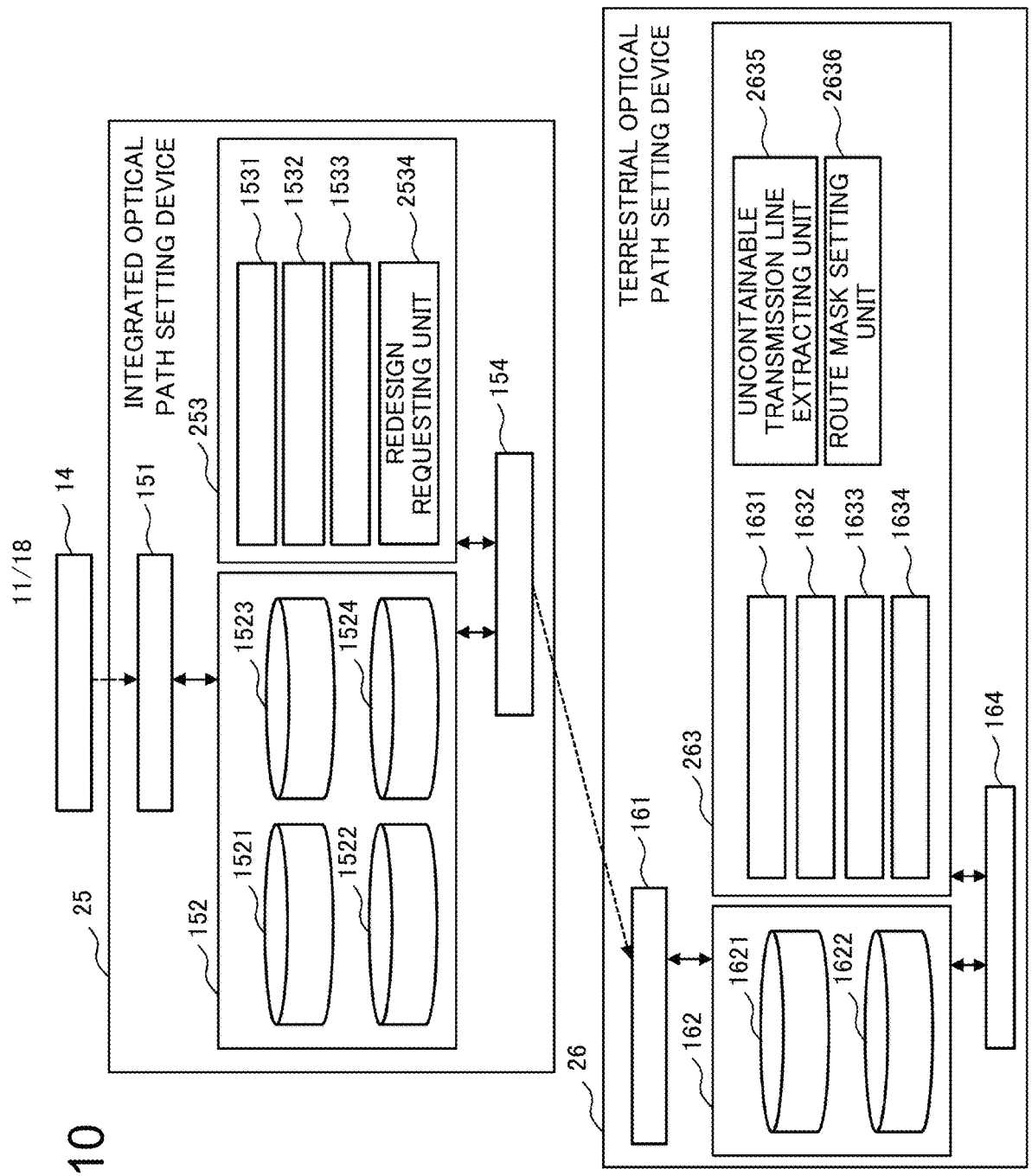
FIG. 10 is a block diagram illustrating configurations of an integrated optical path setting device and a terrestrial optical path setting device included in a terrestrial/submarine integrated optical communication system according to a third example embodiment of the present invention.

FIG. 10 illustrates configurations of an integrated optical path setting device 25 and a terrestrial optical path setting device 26 included in a terrestrial/submarine integrated optical communication system 20 according to the present example embodiment. In the following description, detailed description about configurations similar to the terrestrial/submarine integrated optical communication system 10 according to the second example embodiment will be omitted.

The integrated optical path setting device 25 includes a traffic request receiving unit 151, an integrated optical communication system DB unit 152, an optical path designing unit 253, and an optical path setting device communication unit 154. The optical path designing unit 253 includes a redesign requesting unit (a redesign determining means) 2534, in addition to a transmission characteristic totalizing unit 1531, a transmission propriety determining unit 1532, and an accommodating wavelength slot number determining unit 1533. Herein, when the number of wavelength slots where an optical path accommodating a requested traffic can be allocated is insufficient, the redesign requesting unit 2534 requests the terrestrial optical path setting device 26 to redesign the optical path.

The terrestrial optical path setting device (a first optical path setting device) 26 is connected with the integrated optical path setting device 25, and includes a path setting information transmitting/receiving unit 161, a terrestrial optical communication system DB unit 162, a terrestrial section optical path designing unit 263, and a terrestrial node device communication unit 164.

The terrestrial section optical path designing unit 263 includes an uncontainable transmission line extracting unit (an uncontainable transmission line extracting means) 2635 and a route mask setting unit (a route mask setting means) 2636, in addition to a terrestrial route selecting unit 1631, a transmission characteristic calculating unit 1632, a required wavelength slot determining unit 1633, and an accommodating wavelength slot number determining unit 1634.

The uncontainable transmission line extracting unit 2635 extracts an optical fiber transmission line incapable of securing a wavelength band where an optical path having a required wavelength bandwidth can be allocated. In other words, the uncontainable transmission line extracting unit 2635 extracts an optical fiber transmission line 111 incapable of securing the number of wavelength slots where an optical path meeting a transmission characteristic notified by the integrated optical path setting device 25 can be allocated.

The route mask setting unit 2636 sets a route mask for the optical fiber transmission line 111, and excludes the optical fiber transmission line 111 from a route search target.

Figure 11:
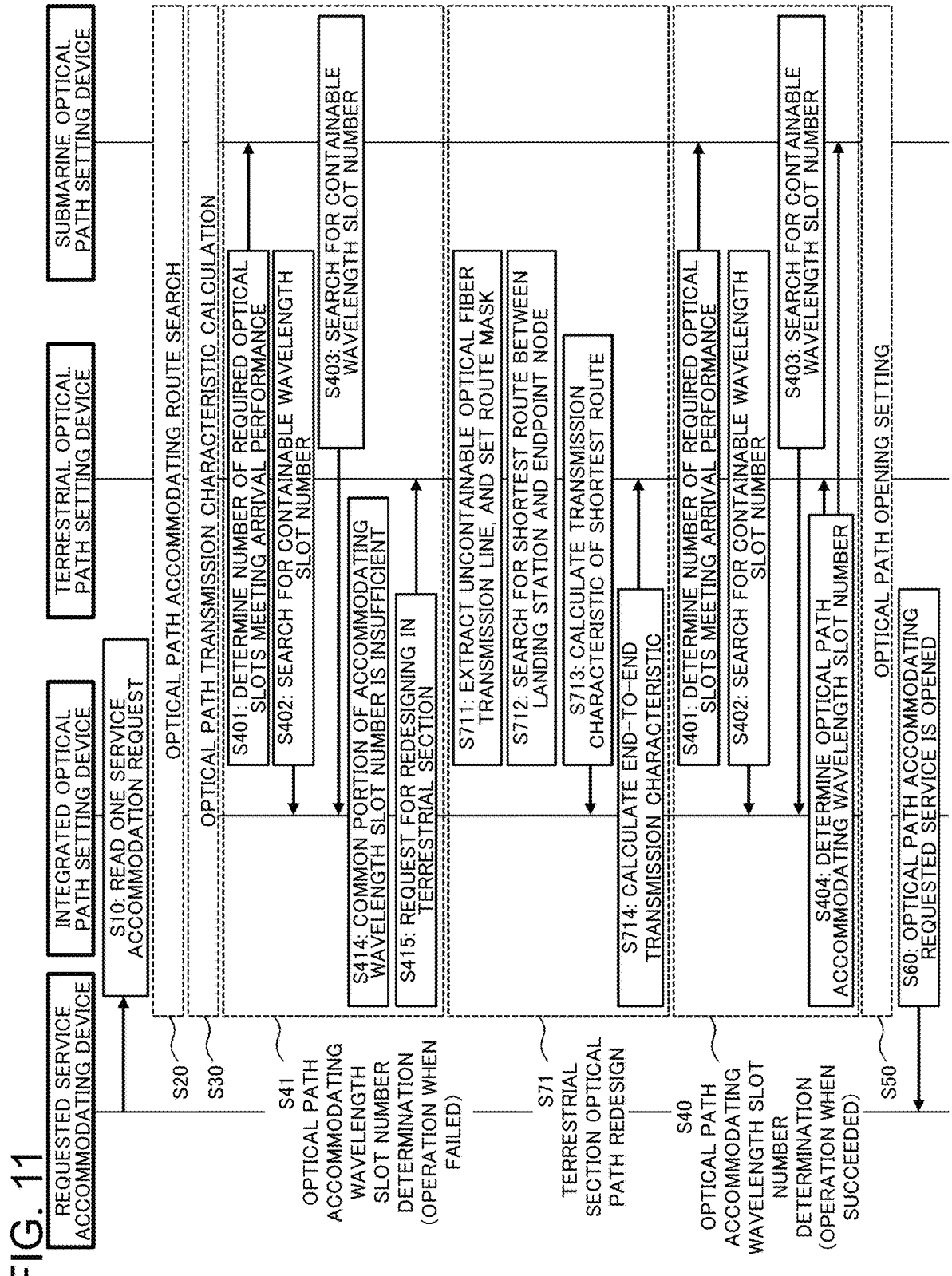
FIG. 11 is a sequence diagram for describing an operation of the terrestrial/submarine integrated optical communication system according to the third example embodiment of the present invention.

Next, an operation of the terrestrial/submarine integrated optical communication system 20 according to the present example embodiment will be described. FIG. 11 is a sequence diagram for describing the operation of the terrestrial/submarine integrated optical communication system 20 according to the present example embodiment.

First, the integrated optical path setting device 25 reads, from the requested service accommodating device 14, one request for service accommodation in the terrestrial/submarine integrated optical communication system (Step S10). Based on the service accommodation request, the integrated optical path setting device 15, the terrestrial optical path setting device 16, and the submarine optical path setting device 17 calculate routes of an optical path (Step S20). Subsequently, the terrestrial optical path setting device 16 and the submarine optical path setting device 17 calculate transmission characteristics of the optical path routes accommodating a requested service. Then, the integrated optical path setting device 15 calculates an end-to-end transmission characteristic $Q_{E2E}$[dB], and notifies the terrestrial optical path setting device 26 (Step S30).

Subsequently, in optical path accommodating wavelength slot number determination (Step S41), the required wavelength slot determining unit 1633 included in the terrestrial optical path setting device 26 determines, based on $Q_{E2E}$ calculated by the integrated optical path setting device 15, the number of required optical slots meeting an arrival performance of the optical path. Then, the herein-determined number of required optical slots is notified to the submarine optical path setting device 17 (Step S401).

The accommodating wavelength slot number determining unit 1634 included in the terrestrial optical path setting device 26 searches for, regarding the optical fiber transmission line 111 on the shortest route, an available wavelength slot capable of accommodating the optical path having bands of the number of required wavelength slots. Then, the terrestrial optical path setting device 26 notifies the integrated optical path setting device 15 of an accommodating wavelength slot number acquired as a result of search (Step S402). Similarly, the accommodating wavelength slot number determining unit 1734 included in the submarine optical path setting device 17 searches for, regarding a submarine cable 121 on the shortest route, an available wavelength slot capable of accommodating the optical path having bands of the determined number of required wavelength slots. Then, the submarine optical path setting device 17 notifies the integrated optical path setting device 25 of an accommodating wavelength slot number acquired as a result of search (Step S403).

The accommodating wavelength slot number determining unit 1533 included in the integrated optical path setting device 25 refers to the landing station path allocation information DB 1522, and searches for a common portion of a containable wavelength slot number in each optical communication system. As a result of search, the common portion of the containable wavelength slot number may sometimes be insufficient for the number of required wavelength slots (Step S414). In this case, the redesign requesting unit 2534 included in the integrated optical path setting device 25 extracts the terrestrial optical communication system 11 that includes the optical fiber transmission line 111 having the minimum common portion of the containable wavelength slot number. Then, the integrated optical path setting device 25 notifies the terrestrial path setting device 26 included in the terrestrial optical communication system 11 of the common portion of the containable wavelength slot number excluding the terrestrial optical communication system 11, and requests for redesigning of the optical path in a terrestrial section (Step S415).

In terrestrial section optical path redesign (Step S71), first, the uncontainable transmission line extracting unit 2635 included in the terrestrial path setting device 26 extracts an optical fiber transmission line having fewer consecutive available wavelength slots than the number of required wavelength slots, relating to the notified wavelength slot number. Then, the route mask setting unit 2636 included in the terrestrial path setting device 26 sets a route mask for the uncontainable optical fiber (Step S711), and excludes the uncontainable optical fiber from a route search target. After the route mask is set, the terrestrial path setting device 26 searches for the shortest route between a landing station and an endpoint node device (Step S712). Then, the transmission characteristic calculating unit (a first transmission characteristic calculating means) 1632 included in the terrestrial path setting device 26 calculates a transmission characteristic (a first transmission characteristic) of the shortest route in the terrestrial section (Step S713).

The terrestrial path setting device 26 notifies the integrated optical path setting device 25 of the herein-calculated transmission characteristic, and the integrated optical path setting device 25 stores the transmission characteristic in the optical path setting device reference information DB 1524. The transmission characteristic totalizing unit 1531 included in the integrated optical path setting device 25 calculates an end-to-end transmission characteristic (Step S714).

With the above-described procedure, a transmission characteristic of the optical path accommodating the requested service after redesigning the optical path in the terrestrial section is calculated. The integrated optical path setting device 25 notifies the terrestrial optical path setting device 26 of the herein-calculated end-to-end transmission characteristic $Q_{E2E}$ (Step S714).

As a result of the above-described route search (Step S20), when it is revealed that there is no route capable of accommodating the optical path, the integrated optical path setting device 25 may open the optical path by terminating the optical path at a landing station.

Then, in optical path accommodating wavelength slot number determination (Step S40), the integrated optical path setting device 25 determines an accommodating wavelength slot number, based on the end-to-end transmission characteristic $Q_{E2E}$, according to the procedure (Steps S401 to S404) described in the second example embodiment (Step S404). At this time, for example, a first-fit allocation scheme, a most-used allocation scheme, a least-used allocation scheme, or the like may be used.

When the integrated optical path setting device 25 notifies the requested service accommodating device 14 of notification of optical path opening after optical path opening setting (Step S50) is carried out, an operation of opening the optical path accommodating the requested service is completed (Step S60).

Figure 12:
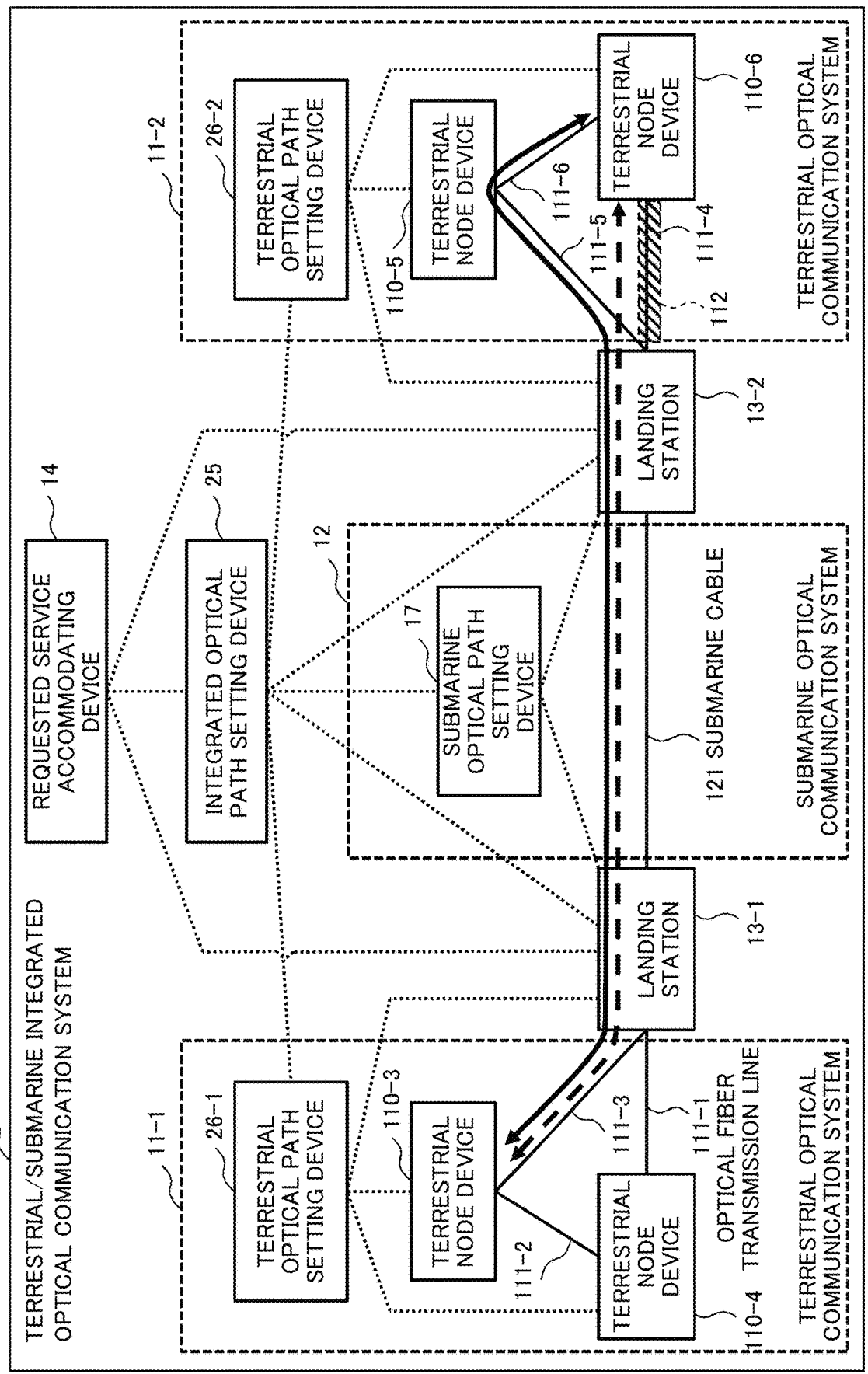
FIG. 12 is a block diagram illustrating a configuration of the terrestrial/submarine integrated optical communication system according to the third example embodiment of the present invention, and is a diagram for describing a procedure for setting a route mask and redesigning an optical path.

Next, a procedure for setting a route mask and redesigning an optical path in the terrestrial/submarine integrated optical communication system 20 according to the present example embodiment will be described in further detail by using FIG. 12. Herein, as illustrated in FIG. 12, a case in which an optical path accommodating a requested traffic between two terrestrial node devices 110-3 and 110-6 is opened will be described as an example.

Similarly to the description in the second example embodiment, the shortest route is calculated as a route passing through the submarine cable 121 and optical fiber transmission lines 111-3 and 111-4 via landing stations 13-1 and 13-2.

Figure 13:
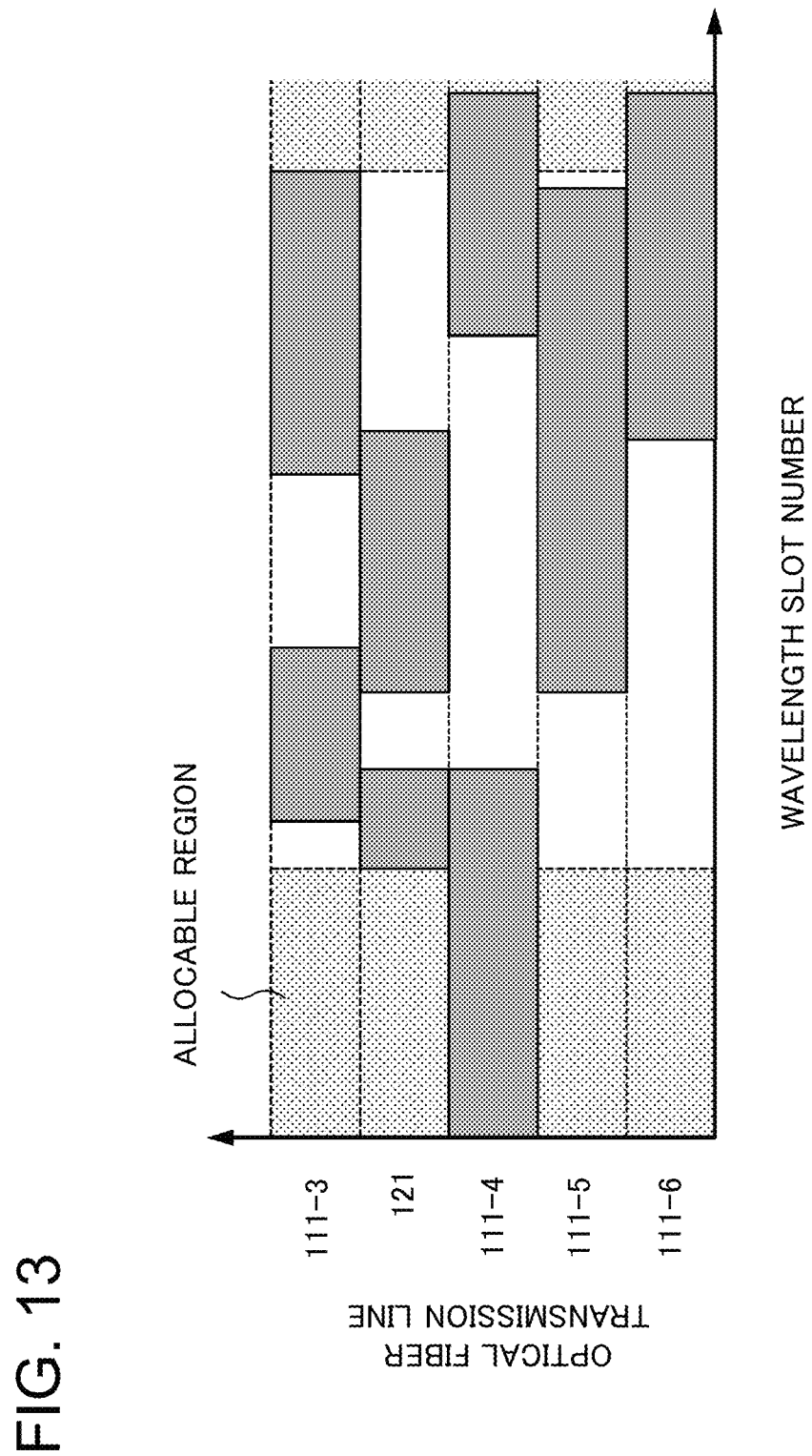
FIG. 13 is a diagram illustrating a usage status of a wavelength slot in the terrestrial/submarine integrated optical communication system according to the third example embodiment of the present invention.
Figure 16:
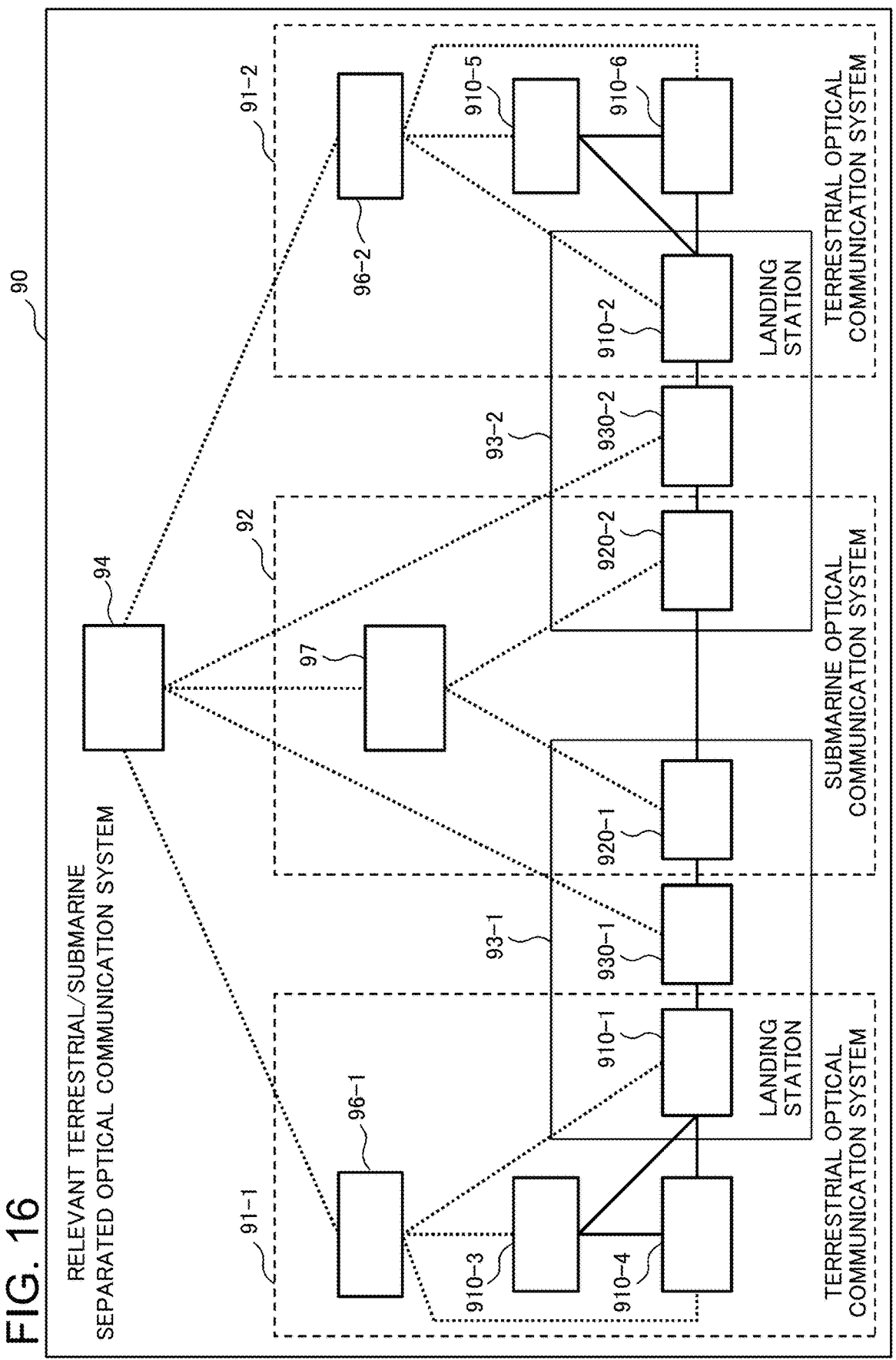
FIG. 16 is a block diagram illustrating a configuration of a relevant terrestrial/submarine separated optical communication system.

FIG. 13 illustrates an example of a usage status of a wavelength slot in the terrestrial/submarine integrated optical communication system 20. As illustrated in FIG. 13, the optical fiber transmission line 111-4 has the minimum common portion of a containable wavelength slot number. In view of this, redesigning of an optical path is carried out on the terrestrial optical communication system 11-2 to which the optical fiber transmission line 111-4 belongs. At this time, as illustrated in FIG. 12, a route mask 112 is set for the optical fiber transmission line 111-4, and the optical fiber transmission line 111-4 is excluded from a route search target. As a result of performing redesigning of the optical path, a route passing through the submarine cable 121, the optical fiber transmission line 111-3, and optical fiber transmission lines 111-5 and 111-6 via the landing stations 13-1 and 13-2 is selected as an accommodating route of the optical path.

FIGS. 14A and 14B illustrate one example of characteristic parameters for calculating a transmission characteristic of an optical path. When the characteristic parameters illustrated in FIGS. 14A and 14B are used, an end-to-end transmission characteristic $Q_{E2E}$[dB] can be calculated as follows.

$$Q_{E2E} = -0.2 - 0.2 - 10 \log_{10}(10^{-28.0/10} + 10^{-25.0/10} + 10^{-27.0/10} + 10^{-18.0/10}) = 16.5 \text{ [dB]}$$

Herein, when margin setting values in the optical communication systems are considered and the maximum value (3.0 dB) among the margin setting values is used, a transmission characteristic necessary for opening an optical path is 13.5 dB. From the setting range of the variable optical path transmitting/receiving unit illustrated in FIG. 9, when a transmission characteristic is 13.5 dB, variable optical path transmitting/receiving units 1103 included in terrestrial node devices 110-5 and 110-6 can select, as a modulation scheme, a BPSK scheme or a QPSK scheme. In this case, the QPSK scheme having higher frequency use efficiency may be selected.

According to the above-described example embodiment, description has been given of a configuration in which the terrestrial section optical path designing unit 263 included in the terrestrial optical path setting device 26 includes the uncontainable transmission line extracting unit 2635 and the route mask setting unit 2636. However, without limitation thereto, as illustrated in FIG. 15, a configuration may be made in which a submarine section optical path designing unit 273 included in a submarine optical path setting device 27 includes an uncontainable transmission line extracting unit 2735 and a route mask setting unit 2736. In this case, when the number of wavelength slots where an optical path accommodating a requested traffic can be allocated is insufficient, the submarine optical path setting device 27 carries out redesigning of the target optical path upon receiving notification from the redesign requesting unit 2534 included in the integrated optical path setting device 25.

As described above, in the terrestrial/submarine integrated optical communication system 20 according to the present example embodiment, introduction of the integrated optical path setting device 25 enables sharing of optical path setting information and transmission line design information between the terrestrial optical path setting device 26 and the submarine optical path setting device 27. Then, a configuration is made in which an optical path setting parameter (an optical path setting value) is determined based on these pieces of shared information, and, based on the optical path setting parameter, the node devices send an optical path. This enables improvement of an opening probability of an optical path.

In other words, the terrestrial/submarine integrated optical communication system 20 and the integrated optical path setting device 25 according to the present example embodiment are able to increase an opening probability of an optical path, even in a configuration in which a terrestrial optical communication system and a submarine optical communication system are connected by introducing a coarse-granularity switching device.

The whole or part of the example embodiments disclosed above can be described as, but not limited to, the following supplementary notes.

(Supplementary note 1) An optical path setting device including: a transmission characteristic calculating means for calculating an inter-endpoint transmission characteristic being a transmission characteristic between endpoints of an optical path accommodating traffic in a plurality of optical communication systems; a required wavelength bandwidth determining means for determining, based on the inter-endpoint transmission characteristic, a required wavelength bandwidth being a wavelength bandwidth meeting an arrival performance of the optical path; and an accommodating wavelength band determining means for determining, as an accommodating wavelength band for accommodating the optical path, a common wavelength band that is a wavelength band where the optical path having the required wavelength bandwidth can be allocated and that is common to the plurality of optical communication systems.

(Supplementary note 2) The optical path setting device according to supplementary note 1, wherein the transmission characteristic calculating means totalizes a transmission characteristic of the optical path in an individual optical communication system included in the plurality of optical communication systems, and calculates the inter-endpoint transmission characteristic by considering degradation of the transmission characteristic being caused by connecting the plurality of optical communication systems.

(Supplementary note 3) The optical path setting device according to supplementary note 1 or 2, further including a redesign determining means for comparing the common wavelength band with the required wavelength bandwidth, and, when the common wavelength band is insufficient for the required wavelength bandwidth, determining to perform redesigning of the optical path.

(Supplementary note 4) The optical path setting device according to any one of supplementary notes 1 to 3, wherein the plurality of optical communication systems are connected by switching a route on a path basis.

(Supplementary note 5) The optical path setting device according to any one of supplementary notes 1 to 4, wherein the plurality of optical communication systems include a terrestrial optical communication system in which an optical fiber transmission line constituting the optical communication system is laid only on land, and a submarine optical communication system in which an optical fiber transmission line constituting the optical communication system is accommodated in a submarine cable.

(Supplementary note 6) The optical path setting device according to any one of supplementary notes 1 to 5, wherein the transmission characteristic is calculated by combining any of a level diagram design value, a wavelength bandwidth, a center wavelength, a guard band bandwidth, a number of stages of pass-through node devices, and an optical fiber design value of the optical path.

(Supplementary note 7) An optical communication system including: a first optical communication system including a first optical path setting device and a first node device; a second optical communication system including a second optical path setting device and a second node device; and an integrated optical path setting device configured to control the first optical path setting device and the second optical path setting device, wherein the integrated optical path setting device includes: a transmission characteristic calculating means for calculating an inter-endpoint transmission characteristic being a transmission characteristic between endpoints of an optical path accommodating traffic in a plurality of optical communication systems including the first optical communication system and the second optical communication system; a required wavelength bandwidth determining means for determining, based on the inter-endpoint transmission characteristic, a required wavelength bandwidth being a wavelength bandwidth meeting an arrival performance of the optical path; and an accommodating wavelength band determining means for determining, as an accommodating wavelength band for accommodating the optical path, a common wavelength band that is a wavelength band where the optical path having the required wavelength bandwidth can be allocated and that is common to the plurality of optical communication systems.

(Supplementary note 8) The optical communication system according to supplementary note 7, further including a connecting means for connecting the first optical communication system with the second optical communication system, wherein the connecting means includes a coarse-granularity switching means for switching a route on a coarse-granularity path basis, the first optical path setting device includes a first transmission characteristic calculating means for calculating a first transmission characteristic being a transmission characteristic of the optical path in the first optical communication system, the second optical path setting device includes a second transmission characteristic calculating means for calculating a second transmission characteristic being a transmission characteristic of the optical path in the second optical communication system, and the transmission characteristic calculating means totalizes the first transmission characteristic and the second transmission characteristic, and calculates the inter-endpoint transmission characteristic by considering degradation of the transmission characteristic in the connecting means.

(Supplementary note 9) The optical communication system according to supplementary note 8, wherein the integrated optical path setting device further includes a redesign determining means for comparing the common wavelength band with the required wavelength bandwidth, and, when the common wavelength band is insufficient for the required wavelength bandwidth, determining to perform redesigning of the optical path.

(Supplementary note 10) The optical communication system according to supplementary note 9, wherein the first optical path setting device further includes: an uncontainable transmission line extracting means for extracting an optical fiber transmission line incapable of securing the wavelength band where the optical path having the required wavelength bandwidth can be allocated; and a route mask setting means for setting a route mask for the optical fiber transmission line and excluding the optical fiber transmission line from a route search target, wherein the first transmission characteristic calculating means calculates, as the first transmission characteristic, a transmission characteristic of a shortest route acquired when route search is performed by setting the route mask.

(Supplementary note 11) The optical communication system according to any one of supplementary notes 7 to 10, wherein the first optical communication system is one of a terrestrial optical communication system and a submarine optical communication system, the second optical communication system is another of the terrestrial optical communication system and the submarine optical communication system, the terrestrial optical communication system is an optical communication system in which an optical fiber transmission line constituting the terrestrial optical communication system is laid only on land, and the submarine optical communication system is an optical communication system in which an optical fiber transmission line constituting the submarine optical communication system is accommodated in a submarine cable.

(Supplementary note 12) The optical communication system according to any one of supplementary notes 7 to 11, wherein the transmission characteristic is calculated by combining any of a level diagram design value, a wavelength bandwidth, a center wavelength, a guard band bandwidth, a number of stages of pass-through node devices, and an optical fiber design value of the optical path.

(Supplementary note 13) An optical path setting method including: calculating an inter-endpoint transmission characteristic being a transmission characteristic between endpoints of an optical path accommodating traffic in a plurality of optical communication systems; determining, based on the inter-endpoint transmission characteristic, a required wavelength bandwidth being a wavelength bandwidth meeting an arrival performance of the optical path; and determining, as an accommodating wavelength band for accommodating the optical path, a common wavelength band that is a wavelength band where the optical path having the required wavelength bandwidth can be allocated and that is common to the plurality of optical communication systems.

(Supplementary note 14) The optical path setting method according to supplementary note 13, wherein the calculating the inter-endpoint transmission characteristic includes totalizing a transmission characteristic of the optical path in an individual optical communication system included in the plurality of optical communication systems, and calculating the inter-endpoint transmission characteristic by considering degradation of the transmission characteristic being caused by connecting the plurality of optical communication systems.

(Supplementary note 15) The optical path setting method according to supplementary note 13 or 14, further including comparing the common wavelength band with the required wavelength bandwidth, and, when the common wavelength band is insufficient for the required wavelength bandwidth, determining to perform redesigning of the optical path.

(Supplementary note 16) The optical path setting method according to any one of supplementary notes 13 to 15, wherein the plurality of optical communication systems are connected by switching a route on a path basis.

(Supplementary note 17) The optical path setting method according to any one of supplementary notes 13 to 16, wherein the plurality of optical communication systems include a terrestrial optical communication system in which an optical fiber transmission line constituting the optical communication system is laid only on land, and a submarine optical communication system in which an optical fiber transmission line constituting the optical communication system is accommodated in a submarine cable.

(Supplementary note 18) The optical path setting method according to any one of supplementary notes 13 to 17, wherein the transmission characteristic is calculated by combining any of a level diagram design value, a wavelength bandwidth, a center wavelength, a guard band bandwidth, a number of stages of pass-through node devices, and an optical fiber design value of the optical path.

(Supplementary note 19) A computer-readable recording medium that records a program for causing a computer to function as: a transmission characteristic calculating means for calculating an inter-endpoint transmission characteristic being a transmission characteristic between endpoints of an optical path accommodating traffic in a plurality of optical communication systems; a required wavelength bandwidth determining means for determining, based on the inter-endpoint transmission characteristic, a required wavelength bandwidth being a wavelength bandwidth meeting an arrival performance of the optical path; and an accommodating wavelength band determining means for determining, as an accommodating wavelength band for accommodating the optical path, a common wavelength band that is a wavelength band where the optical path having the required wavelength bandwidth can be allocated and that is common to the plurality of optical communication systems.

(Supplementary note 20) The computer-readable recording medium that records a program according to supplementary note 19, wherein the transmission characteristic calculating means totalizes a transmission characteristic of the optical path in an individual optical communication system included in the plurality of optical communication systems, and calculates the inter-endpoint transmission characteristic by considering degradation of the transmission characteristic being caused by connecting the plurality of optical communication systems.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

100 Optical path setting device
101 Transmission characteristic calculating unit
102 Required wavelength bandwidth determining unit
103 Accommodating wavelength band determining unit
10, 10-1, 20 Terrestrial/submarine integrated optical communication system
11, 11-1, 11-2 Terrestrial optical communication system 110, 110-1, 110-2, 110-3, 110-4, 110-5, 110-6 Terrestrial node device
1101 Device setting transmitting/receiving unit
1102 Terrestrial node device control unit
1103 Variable optical path transmitting/receiving unit
1104 Optical path multiplexing/demultiplexing unit
111, 111-1, 111-2, 111-3, 111-4, 111-5, 111-6 Optical fiber transmission line
112 Route mask
12, 12-1 Submarine optical communication system
120, 120-1, 120-2 Submarine node device
1201 Device setting transmitting/receiving unit
1202 Submarine node device control unit
1203 Variable optical path transmitting/receiving unit
1204 Optical path multiplexing/demultiplexing unit
121, 121-1, 121-2, 121-3 Submarine cable
122 Submarine branching device
13, 13-1, 13-2, 13-3 Landing station
130, 130-1, 130-2 Fine-granularity switching device
14 Requested service accommodating device
140, 140-1, 140-2 Coarse-granularity switching device
15, 25 Integrated optical path setting device
150, 150-1, 150-2 Submarine cable operating device
151 Traffic request receiving unit
152 Integrated optical communication system database (DB) unit
1521 Optical node device allocation information DB
1522 Landing station path allocation information DB
1523 Landing station device characteristic information DB
1524 Optical path setting device reference information DB
153, 253 Optical path designing unit
1531 Transmission characteristic totalizing unit
1532 Transmission propriety determining unit
1533 Accommodating wavelength slot number determining unit
2534 Redesign requesting unit
154 Optical path setting device communication unit
16, 16-1, 16-2, 26, 26-1, 26-2 Terrestrial optical path setting device
161 Path setting information transmitting/receiving unit
162 Terrestrial optical communication system database (DB) unit
1621 Terrestrial section path allocation information DB
1622 Terrestrial section topology
163, 263 Terrestrial section optical path designing unit
1631 Terrestrial line selecting unit
1632 Transmission characteristic calculating unit
1633 Required wavelength slot determining unit
1634 Accommodating wavelength slot number determining unit
2635 Uncontainable transmission line extracting unit
2636 Route mask setting unit
164 Terrestrial node device communication unit
17, 27 Submarine optical path setting device
171 Path setting information transmitting/receiving unit
172 Submarine optical communication system database (DB) unit
1721 Submarine section path allocation information DB
1722 Submarine section topology
173 Submarine section optical path designing unit
1731 Submarine route selecting unit
1732 Transmission characteristic calculating unit
1733 Required wavelength slot determining unit
1734 Accommodating wavelength slot number determining unit
2735 Uncontainable transmission line extracting unit
2736 Route mask setting unit
174 Submarine node device communication unit
90 Relevant terrestrial/submarine separated optical communication system
91-1, 91-2 Terrestrial optical communication system
910-1, 910-2, 910-3, 910-4, 910-5, 910-6 Terrestrial node device
92 Submarine optical communication system
920-1, 920-2 Submarine node device
930-1, 930-2 Fine-granularity switching device
94 Requested service accommodating device
96-1, 96-2 Terrestrial optical path setting device
97 Submarine optical path setting device

The invention claimed is:

1. An optical path setting device comprising:
a transmission characteristic calculating unit configured to calculate an inter-endpoint transmission characteristic being a transmission characteristic between endpoints of an optical path accommodating traffic in a plurality of optical communication systems;
a required wavelength bandwidth determining unit configured to determine, based on the inter-endpoint transmission characteristic, a required wavelength bandwidth being a wavelength bandwidth meeting an arrival performance of the optical path; and
an accommodating wavelength band determining unit configured to determine, as an accommodating wavelength band for accommodating the optical path, a common wavelength band that is a wavelength band where the optical path having the required wavelength bandwidth can be allocated and that is common to the plurality of optical communication systems, wherein
the transmission characteristic calculating unit totalizes a transmission characteristic of the optical path in an individual optical communication system included in the plurality of optical communication systems, and calculates the inter-endpoint transmission characteristic by considering degradation of the transmission characteristic being caused by connecting the plurality of optical communication systems.

2. The optical path setting device according to claim 1, further comprising
a redesign determining unit configured to compare the common wavelength band with the required wavelength bandwidth, and, when the common wavelength band is insufficient for the required wavelength bandwidth, determine to perform redesigning of the optical path.

3. The optical path setting device according to claim 1, wherein
the plurality of optical communication systems are connected by switching a route on a path basis.

4. The optical path setting device according to claim 1, wherein
the plurality of optical communication systems include a terrestrial optical communication system in which an optical fiber transmission line constituting the optical communication system is laid only on land, and a submarine optical communication system in which an optical fiber transmission line constituting the optical communication system is accommodated in a submarine cable.

5. The optical path setting device according to claim 1, wherein
the transmission characteristic is calculated by combining any of a level diagram design value, a wavelength bandwidth, a center wavelength, a guard band bandwidth, a number of stages of pass-through node devices, and an optical fiber design value of the optical path.

6. An optical communication system comprising:
a first optical communication system including a first optical path setting device and a first node device;
a second optical communication system including a second optical path setting device and a second node device; and
an integrated optical path setting device configured to control the first optical path setting device and the second optical path setting device, wherein
the integrated optical path setting device includes:
a transmission characteristic calculating unit configured to calculate an inter-endpoint transmission characteristic being a transmission characteristic between endpoints of an optical path accommodating traffic in a plurality of optical communication systems including the first optical communication system and the second optical communication system;
a required wavelength bandwidth determining unit configured to determine, based on the inter-endpoint transmission characteristic, a required wavelength bandwidth being a wavelength bandwidth meeting an arrival performance of the optical path; and
an accommodating wavelength band determining unit configured to determine, as an accommodating wavelength band for accommodating the optical path, a common wavelength band that is a wavelength band where the optical path having the required wavelength bandwidth can be allocated and that is common to the plurality of optical communication systems, wherein
the transmission characteristic calculating unit totalizes a transmission characteristic of the optical path in an individual optical communication system included in the plurality of optical communication systems, and calculates the inter-endpoint transmission characteristic by considering degradation of the transmission characteristic being caused by connecting the plurality of optical communication systems.

7. The optical communication system according to claim 6, further comprising a connecting unit configured to connect the first optical communication system with the second optical communication system, wherein
the connecting unit includes a coarse-granularity switching unit configured to switch a route on a coarse-granularity path basis,
the first optical path setting device includes a first transmission characteristic calculating unit configured to calculate a first transmission characteristic being a transmission characteristic of the optical path in the first optical communication system,
the second optical path setting device includes a second transmission characteristic calculating unit configured to calculate a second transmission characteristic being a transmission characteristic of the optical path in the second optical communication system, and
the transmission characteristic calculating unit totalizes the first transmission characteristic and the second transmission characteristic, and calculates the inter-endpoint transmission characteristic by considering degradation of the transmission characteristic in the connecting unit.

8. The optical communication system according to claim 7, wherein
the integrated optical path setting device further includes a redesign determining unit configured to compare the common wavelength band with the required wavelength bandwidth, and, when the common wavelength band is insufficient for the required wavelength bandwidth, determine to perform redesigning of the optical path.

9. The optical communication system according to claim 8, wherein
the first optical path setting device further includes:
an uncontainable transmission line extracting unit configured to extract an optical fiber transmission line incapable of securing the wavelength band where the optical path having the required wavelength bandwidth can be allocated; and
a route mask setting unit configured to set a route mask for the optical fiber transmission line and exclude the optical fiber transmission line from a route search target,
wherein the first transmission characteristic calculating unit calculates, as the first transmission characteristic, a transmission characteristic of a shortest route acquired when route search is performed by setting the route mask.

10. The optical communication system according to claim 6, wherein
the first optical communication system is one of a terrestrial optical communication system and a submarine optical communication system,
the second optical communication system is another of the terrestrial optical communication system and the submarine optical communication system,
the terrestrial optical communication system is an optical communication system in which an optical fiber transmission line constituting the terrestrial optical communication system is laid only on land, and
the submarine optical communication system is an optical communication system in which an optical fiber transmission line constituting the submarine optical communication system is accommodated in a submarine cable.

11. The optical communication system according claim 6, wherein
the transmission characteristic is calculated by combining any of a level diagram design value, a wavelength bandwidth, a center wavelength, a guard band bandwidth, a number of stages of pass-through node devices, and an optical fiber design value of the optical path.

12. The optical path setting device according to claim 1, further comprising a redesign determining unit configured to compare the common wavelength band with the required wavelength bandwidth, and, when the common wavelength band is insufficient for the required wavelength bandwidth, determine to perform redesigning of the optical path.

13. The optical path setting device according to claim 1, wherein the plurality of optical communication systems are connected by switching a route on a path basis.

14. An optical path setting method comprising:
calculating an inter-endpoint transmission characteristic being a transmission characteristic between endpoints of an optical path accommodating traffic in a plurality of optical communication systems;
determining, based on the inter-endpoint transmission characteristic, a required wavelength bandwidth being a wavelength bandwidth meeting an arrival performance of the optical path; and determining, as an accommodating wavelength band for accommodating the optical path, a common wavelength band that is a wavelength band where the optical path having the required wavelength bandwidth can be allocated and that is common to the plurality of optical communication systems, wherein the calculating the inter-endpoint transmission characteristic includes totalizing a transmission characteristic of the optical path in an individual optical communication system included in the plurality of optical communication systems, and calculating the inter-endpoint transmission characteristic by considering degradation of the transmission characteristic being caused by connecting the plurality of optical communication systems.

15. The optical path setting method according to claim 14, further comprising comparing the common wavelength band with the required wavelength bandwidth, and, when the common wavelength band is insufficient for the required wavelength bandwidth, determining to perform redesigning of the optical path.

16. The optical path setting method according to claim 14, wherein the plurality of optical communication systems are connected by switching a route on a path basis.

17. The optical path setting method according to claim 14, wherein the plurality of optical communication systems include a terrestrial optical communication system in which an optical fiber transmission line constituting the optical communication system is laid only on land, and a submarine optical communication system in which an optical fiber transmission line constituting the optical communication system is accommodated in a submarine cable.

18. The optical path setting method according to claim 14, wherein the transmission characteristic is calculated by combining any of a level diagram design value, a wavelength bandwidth, a center wavelength, a guard band bandwidth, a number of stages of pass-through node devices, and an optical fiber design value of the optical path.

* * * * *